US012085891B2

(12) United States Patent
Abe et al.

(10) Patent No.: US 12,085,891 B2
(45) Date of Patent: Sep. 10, 2024

(54) PROCESS CARTRIDGE HAVING DRUM CARTRIDGE AND DEVELOPING CARTRIDGE INCLUDING FIRST AND SECOND ELECTRICAL CONTACT SURFACES

(71) Applicant: BROTHER KOGYO KABUSHIKI KAISHA, Nagoya (JP)

(72) Inventors: Koji Abe, Okazaki (JP); Naoya Kamimura, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/316,583

(22) Filed: May 12, 2023

(65) Prior Publication Data

US 2023/0280690 A1 Sep. 7, 2023

Related U.S. Application Data

(63) Continuation of application No. 17/716,552, filed on Apr. 8, 2022, now Pat. No. 11,687,030, which is a (Continued)

(30) Foreign Application Priority Data

Mar. 7, 2017 (JP) ................................ 2017-042646

(51) Int. Cl.
*G03G 21/00* (2006.01)
*G03G 21/18* (2006.01)

(52) U.S. Cl.
CPC ..... *G03G 21/1885* (2013.01); *G03G 21/1867* (2013.01); *G03G 21/1878* (2013.01); *G03G 2221/1823* (2013.01)

(58) Field of Classification Search
CPC ........... G03G 15/0863; G03G 21/1885; G03G 21/1867; G03G 21/1878; G03G 21/1875;
(Continued)

(56) References Cited

U.S. PATENT DOCUMENTS 5,708,912 A 1/1998 Lee
5,963,759 A 10/1999 Kojima et al.
(Continued)

FOREIGN PATENT DOCUMENTS

CN 1176414 A 3/1998
CN 103395296 A 11/2013
(Continued)

OTHER PUBLICATIONS

Decision of Refusal issued in related Japanese Patent Application No. 2022-069178, Sep. 19, 2023.
(Continued)

*Primary Examiner* — Robert B Beatty
(74) *Attorney, Agent, or Firm* — Merchant & Gould P.C.

(57) ABSTRACT

A process cartridge includes a drum cartridge that has a drum frame having a a second end portion spaced apart from a first end portion in a first direction and a fourth end portion spaced apart from a third end portion in a second direction, a photosensitive drum rotatable about a first axis extending in the second direction and positioned at the first end portion of the drum frame, and a first storage medium that includes a first electrical contact surface. A developing cartridge is detachably attachable to the drum frame and has a developing roller that is rotatable about a second axis extending in the second direction and a second storage medium including a second electrical contact surface. The first electrical contact surface is positioned closer to the second end portion of the drum frame than the photosensitive drum is to the second end portion of the drum frame in the first direction,
(Continued)

and in a state where the developing cartridge is attached to the drum cartridge, the second electrical contact surface is positioned closer to the second end portion of the drum frame than the photosensitive drum is to the second end portion of the drum frame in the first direction.

20 Claims, 13 Drawing Sheets

Related U.S. Application Data continuation of application No. 17/105,723, filed on Nov. 27, 2020, now Pat. No. 11,300,922, which is a continuation of application No. 16/560,333, filed on Sep. 4, 2019, now Pat. No. 10,859,972, which is a continuation of application No. PCT/JP2017/023028, filed on Jun. 22, 2017.

(58) Field of Classification Search
CPC ....... G03G 21/1652; G03G 2215/0695; G03G 2215/0697; G03G 2221/1823; G03G 2221/166
USPC .................................................... 399/90, 113
See application file for complete search history.

(56) References Cited

U.S. PATENT DOCUMENTS

| | | | | |
|---|---|---|---|---|
| 7,162,174 | B2 | 1/2007 | Suzuki | |
| 7,203,442 | B2 | 4/2007 | Matsubara | |
| 8,238,784 | B2 | 8/2012 | Kusudo | |
| 9,651,916 | B2 | 5/2017 | Kawakami | |
| 10,394,160 | B2 | 8/2019 | Yin | |
| 10,859,972 | B2 | 12/2020 | Abe et al. | |
| 11,300,922 | B2 | 4/2022 | Abe et al. | |
| 2003/0123896 | A1 | 7/2003 | Goto et al. | |
| 2003/0215261 | A1 | 11/2003 | Karakama et al. | |
| 2005/0019061 | A1 | 1/2005 | Karakama et al. | |
| 2005/0078978 | A1 | 4/2005 | Suzuki et al. | |
| 2006/0029418 | A1 | 2/2006 | Ishii et al. | |
| 2006/0029419 | A1 | 2/2006 | Shiraki | |
| 2006/0029420 | A1 | 2/2006 | Ishii et al. | |
| 2006/0029421 | A1 | 2/2006 | Ishii et al. | |
| 2006/0029422 | A1 | 2/2006 | Shiraki | |
| 2006/0029423 | A1 | 2/2006 | Shiraki | |
| 2006/0062589 | A1 | 3/2006 | Sasaki | |
| 2006/0285132 | A1* | 12/2006 | Kwon ................ | G03G 21/1885 358/1.7 |
| 2007/0189781 | A1 | 8/2007 | Katogi et al. | |
| 2008/0159774 | A1 | 7/2008 | Tanabe et al. | |
| 2008/0219698 | A1 | 9/2008 | Shimizu et al. | |
| 2008/0240774 | A1 | 10/2008 | Fukamachi et al. | |
| 2008/0240776 | A1 | 10/2008 | Ishikawa | |
| 2008/0240778 | A1* | 10/2008 | Ishikawa ............ | G03G 15/0896 399/119 |
| 2008/0317499 | A1 | 12/2008 | Nishimura | |
| 2009/0110434 | A1 | 4/2009 | Kusudo et al. | |
| 2010/0209123 | A1 | 8/2010 | Katogi et al. | |
| 2011/0076048 | A1 | 3/2011 | Uto | |
| 2013/0039668 | A1* | 2/2013 | Takahashi .......... | G03G 15/0863 399/113 |
| 2013/0108282 | A1* | 5/2013 | Sonoda .............. | G03G 21/1889 399/26 |
| 2015/0010320 | A1 | 1/2015 | Komatsu et al. | |
| 2015/0192892 | A1 | 7/2015 | Iriyama et al. | |
| 2016/0238993 | A1 | 8/2016 | Kanno | |
| 2016/0266539 | A1 | 9/2016 | Watanabe | |
| 2018/0095420 | A1* | 4/2018 | Abe ................... | G03G 21/1867 |
| 2018/0314185 | A1 | 11/2018 | Yin et al. | |
| 2019/0391529 | A1 | 12/2019 | Abe et al. | |
| 2021/0072696 | A1* | 3/2021 | Abe ................... | G03G 21/1814 |

FOREIGN PATENT DOCUMENTS

| | | | |
|---|---|---|---|
| CN | 103926822 | A | 7/2014 |
| CN | 205750283 | U | 11/2016 |
| EP | 0 822 469 | A1 | 2/1998 |
| EP | 1 326 144 | A1 | 7/2003 |
| JP | H08-211818 | A | 8/1996 |
| JP | 2003-195726 | A | 7/2003 |
| JP | 2003-195730 | A | 7/2003 |
| JP | 2003-330335 | A | 11/2003 |
| JP | 2006-184401 | A | 7/2006 |
| JP | 2007047399 | A | 2/2007 |
| JP | 2007-218975 | A | 8/2007 |
| JP | 2008-242142 | A | 10/2008 |
| JP | 2008-249802 | A | 10/2008 |
| JP | 2009-003174 | A | 1/2009 |
| JP | 2009-109848 | A | 5/2009 |
| JP | 2010-85797 | A | 4/2010 |
| JP | 2011-22315 | A | 2/2011 |
| JP | 2011-191793 | A | 9/2011 |
| JP | 2012-212188 | A | 11/2012 |
| JP | 2013-174653 | A | 9/2013 |
| JP | 2015-14632 | A | 1/2015 |
| JP | 2015-129808 | A | 7/2015 |
| JP | 2015-129814 | A | 7/2015 |
| JP | 2016224221 | A | 12/2016 |
| JP | 2018-146829 | A | 9/2018 |

OTHER PUBLICATIONS

International Search Report and Written Opinion for International Application No. PCT/JP2017/023028 mailed Aug. 1, 2017 (11 pages).
International Preliminary Report on Patentability issued in related International Patent Application No. PCT/JP2017/023028, Sep. 19, 2019.
Extended European Search Report issued in corresponding European Patent Application No. 17899404.2, Dec. 8, 2020.
Office Action issued in related Japanese Patent Application No. 2017-042646, Mar. 16, 2021.
Office Action issued in corresponding Chinese Patent Application No. 201780088143.4, Jul. 5, 2021.
Office Action issued in corresponding Japanese Patent Application No. 2017-042646, Oct. 26, 2021.
Office Action issued in corresponding Chinese Patent Application No. 201780088143.4, Feb. 23, 2022.
Office Action issued in corresponding European Patent Application No. 17899404.2, mailed May 25, 2022.
Office Action (Notice of Reasons for Refusal) issued in related Japanese Patent Application No. 2022-069178, Mar. 7, 2023.
Office Action issued in corresponding Japanese Application No. 2023-209961, Jul. 23, 2024.

* cited by examiner

PROCESS CARTRIDGE HAVING DRUM CARTRIDGE AND DEVELOPING CARTRIDGE INCLUDING FIRST AND SECOND ELECTRICAL CONTACT SURFACES

CROSS REFERENCE TO RELATED APPLICATION

This is a continuation of U.S. application Ser. No. 17/716,552, filed Apr. 8, 2022, now U.S. Pat. No. 11,687,030, which is a continuation of U.S. application Ser. No. 17/105,723, filed Nov. 27, 2020, now U.S. Pat. No. 11,300,922, which is a continuation of U.S. application Ser. No. 16/560,333, filed Sep. 4, 2019, now U.S. Pat. No. 10,859,972, which is a continuation of International Application No. PCT/JP2017/023028 filed Jun. 22, 2017, which claims priority from Japanese Patent Application No. 2017-042646 filed Mar. 7, 2017. The entire contents of the earlier applications are incorporated herein by reference.

TECHNICAL FIELD

The present disclosure relates to a drum cartridge and a process cartridge.

BACKGROUND

Conventionally, there has been known a process cartridge detachably attachable to an electro-photographic image-forming apparatus, such as an LED printer. Suh a process cartridge includes a developing cartridge and a drum cartridge. The developing cartridge includes a developing roller, while the drum cartridge includes a photosensitive drum. Upon attachment of the developing cartridge to the drum cartridge, a peripheral surface of the developing roller faces a peripheral surface of the photosensitive drum.

For example, Japanese Patent Application Publication No. 2008-249802 discloses a process cartridge configured of a developing cartridge and a drum cartridge.

SUMMARY

Further, conventionally, there is also known a developing cartridge including a storage medium. The storage medium may be an IC chip, for example. In the storage medium, various kinds of information relating to the developing cartridge may be stored. In recent years, image-forming apparatuses may deal with a lot of information not only relating to developing cartridges, but also relating to drum cartridges. Hence, there is an increasing demand that a storage medium be mounted in a drum cartridge. However, upon attachment of a developing cartridge to a frame (drum frame) of a drum cartridge, part of an outer surface of the drum frame may be covered by the attached developing cartridge.

In view of the foregoing, it is an object of the disclosure to provide a structure that allows an electrical contact surface of a storage medium can contact a terminal of an image-forming apparatus even in a state where the storage medium is disposed on an outer surface of a drum frame and a developing cartridge is attached to the drum frame.

In order to attain the above and other objects, according to a first aspect of the present disclosure, there is provided a drum cartridge including a drum frame, a photosensitive drum, and a first storage medium. A developing cartridge is detachably attachable to the drum frame. The drum frame has one end portion and another end portion spaced apart from the one end portion in a first direction. The photosensitive drum is rotatable about a first axis extending in a second direction. The photosensitive drum is positioned at the one end portion. The first storage medium has a first electrical contact surface. The first storage medium is positioned at an outer surface of the drum frame, the outer surface being exposed in a state where the developing cartridge is attached to the drum frame.

According to a second aspect of the present disclosure, there is provided a process cartridge including: the above drum cartridge according to the first aspect; and a developing cartridge. The developing cartridge includes: a casing configured to store toner, the casing having one end portion and another end portion spaced apart from the one end portion in the first direction; a developing roller rotatable about a second axis extending in the second direction and positioned at the one end portion of the casing in the first direction; and a second storage medium having a second electrical contact surface.

DETAILED DESCRIPTION

Hereinafter, one embodiment of the present disclosure will be described with reference to the accompanying drawings.

In the following description, a direction connecting a handle and a photosensitive drum of a drum cartridge will be referred to as "first direction." Further, a direction in which a rotational axis of the photosensitive drum extends will be referred to as a "second direction." Further, a direction crossing a drum bottom plate will be referred to as "third direction." In the embodiment described below, the first direction and the second direction cross each other (preferably, orthogonal to each other); the second direction and the third direction cross each other (preferably, orthogonal to each other); and the third direction and the first direction cross each other (preferably, orthogonal to each other).

1. PROCESS CARTRIDGE

Figure 1:
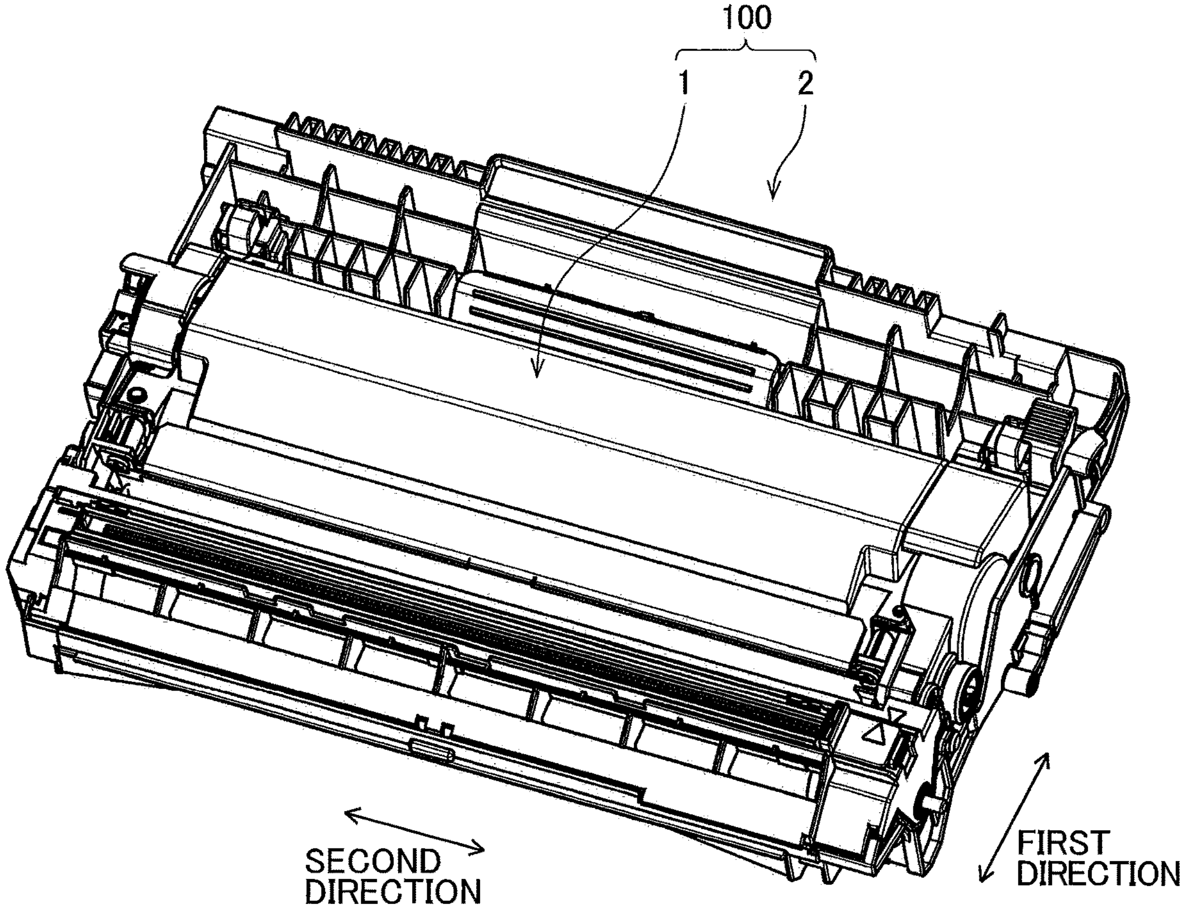
FIG. 1 is a perspective view of a process cartridge according to one embodiment.

FIG. 1 is a perspective view illustrating a state where a developing cartridge 1 is attached to a drum cartridge 2. Hereinafter, a cartridge in which the developing cartridge 1 is attached to the drum cartridge 2 will be referred to as a process cartridge 100. The process cartridge 100 is a replaceable unit configured to be used in an electrophotographic-type image-forming apparatus. A later printer or an LED printer is an example of such an electrophotographic-type image-forming apparatus. The image-forming apparatus includes a frame for retaining the process cartridge 100. The process cartridge 100 is attachable to and detachable from the frame of the image-forming apparatus. Incidentally, the process cartridge 100 is prepared for toner of each color. For example, in case of an image-forming apparatus using four colors of toner, four of the process cartridges 100 are attached individually.

As illustrated in FIG. 1, the process cartridge 100 includes the developing cartridge 1 and the drum cartridge 2. The developing cartridge 1 is attachable to and detachable from the drum cartridge 2. Hence, only one of the developing cartridge 1 and drum cartridge 2 can be replaced with a new one. With this structure, a user of the image-forming apparatus can effectively consume a service life of the developing cartridge 1 and a service life of the drum cartridge 2, individually.

2. DRUM CARTRIDGE

2-1. Structure of the Drum Cartridge

Figure 2:
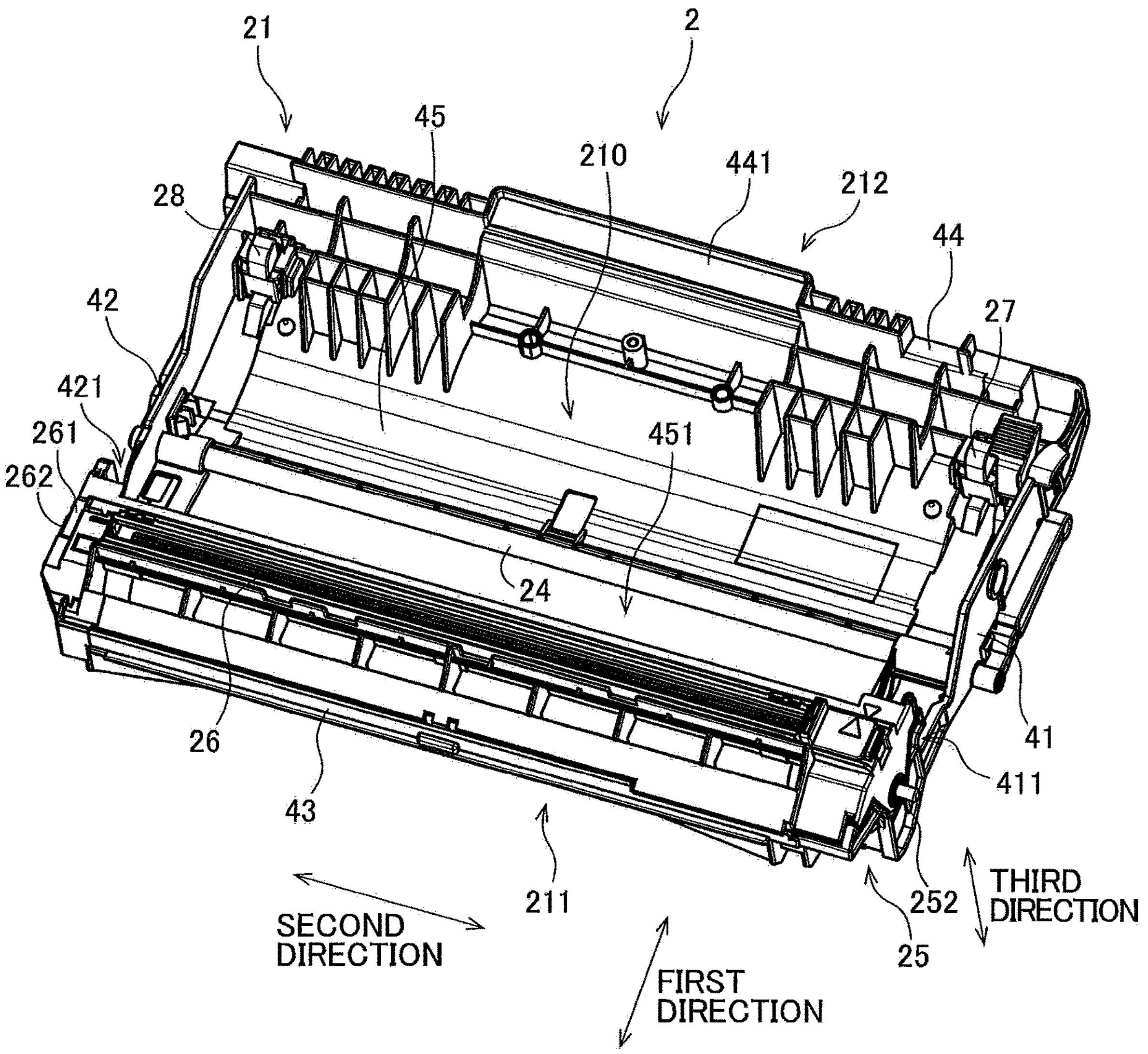
FIG. 2 is a perspective view of a drum cartridge of the process cartridge according to the embodiment.
Figure 3:
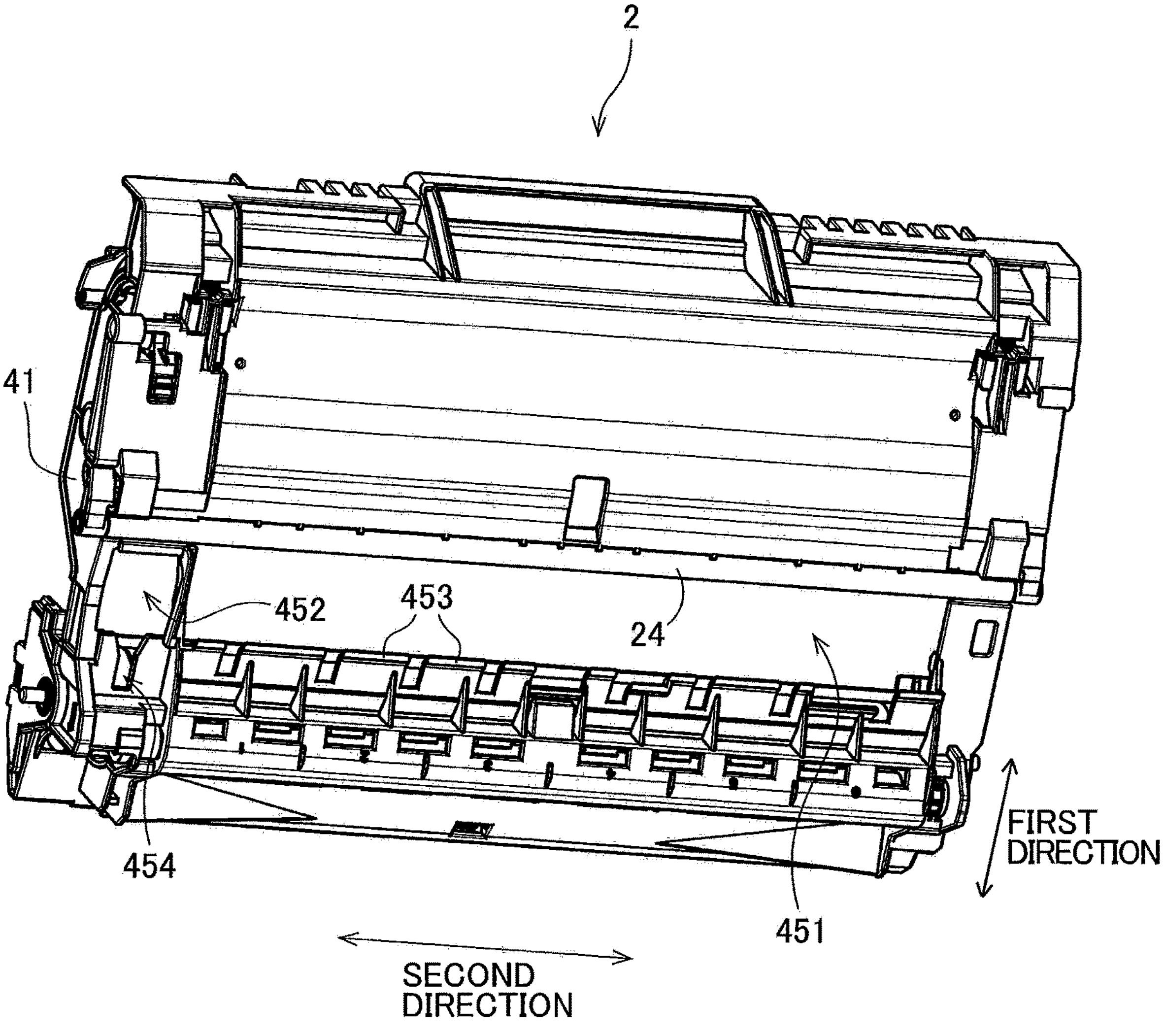
FIG. 3 is another perspective view of the drum cartridge of the process cartridge according to the embodiment.
Figure 4:
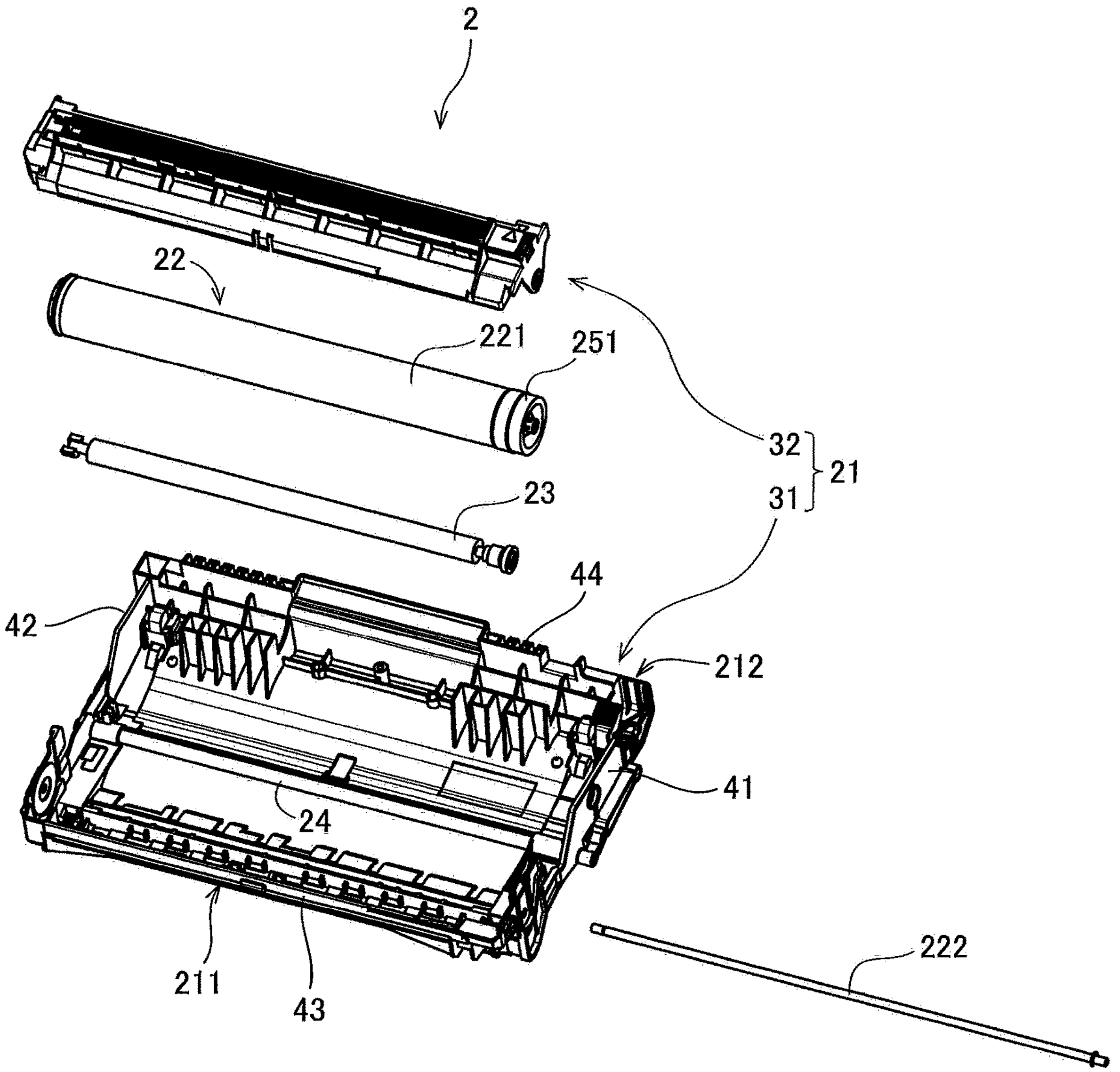
FIG. 4 is an exploded perspective view of the drum cartridge of the process cartridge according to the embodiment.

FIGS. 2 and 3 are perspective views of the drum cartridge 2. FIG. 4 is a exploded perspective view of the drum cartridge 2. The drum cartridge 2 is configured to transfer the toner supplied from the developing cartridge 1 onto printing sheets via a photosensitive drum 22. As illustrated in FIGS. 2-4, the drum cartridge 2 of the present embodiment includes a drum frame 21, the photosensitive drum 22, a transfer roller 23, a conveying roller 24, a gear portion 25, a charging device 26, a first pressing member 27 and a second pressing member 28.

The drum frame 21 is a frame to which the developing cartridge 1 is attachable. As illustrated in FIG. 4, the drum frame 21 of the present embodiment is configured of two members, i.e., a frame main body 31, and a frame cover 32. The frame cover 32 is fixed to the frame main body 31. The photosensitive drum 22 and transfer roller 23 are positioned between the frame main body 31 and frame cover 32. Incidentally, the drum frame 21 may be configured of a single member, or three or more different members.

As illustrated in FIGS. 2 and 3, the drum frame 21 has one end portion 211 in the first direction, and another end portion 212 spaced away from the one end portion 211 in the first direction. The one end portion 211 is closer to the photosensitive drum 22 than the another end portion 212 is to the photosensitive drum 22. The drum frame 21 has a recessed portion 210 for receiving the developing cartridge 1 between the one end portion 211 and another end portion 212.

The drum frame 21 includes a first drum side plate 41, a second drum side plate 42, a first connecting plate 43, a second connecting plate 44, and a drum bottom plate 45.

The first drum side plate 41 is positioned at one end of the drum frame 21 in the second direction. The first drum side plate 41 extends in the first direction and third direction. In a state where the developing cartridge 1 is attached to the drum frame 21, the first drum side plate 41 covers part of a gear cover 152 (described later) of the developing cartridge 1. Also, in the state where the developing cartridge 1 is attached to the drum frame 21, the first drum side plate 41 faces a first developing side plate 111 (described later) of the developing cartridge 1 in the second direction. The first drum side plate 41 has a first guide groove 411. In a state where the developing cartridge 1 is attached to the drum cartridge 2, one end of a developing-roller shaft 132 (described later) in the second direction is fitted in the first guide groove 411.

The second drum side plate 42 is positioned at another end of the drum frame 21 in the second direction. The second drum side plate 42 extends in the first direction and third direction. The first drum side plate 41 and second drum side plate 42 are spaced apart from each other in the second direction. The photosensitive drum 22 and transfer roller 23 are positioned between the first drum side plate 41 and second drum side plate 42. In the state where the developing cartridge 1 is attached to the drum cartridge 2, the second drum side plate 42 covers part of an outer surface of a second developing side plate 112 of a casing 11 (described later). Further, in the state where the developing cartridge 1 is attached to the drum frame 21, the second drum side plate 42 faces the second developing side plate 112 of the developing cartridge 1 in the second direction. The second drum side plate 42 has a second guide groove 421. In the state where the developing cartridge 1 is attached to the drum cartridge 2, another end of the developing-roller shaft 132 in the second direction is fitted in the second guide groove 421.

The first connecting plate 43 is positioned at the one end portion 211 of the drum frame 21 in the first direction. The first connecting plate 43 extends in the second direction between one end portion of the first drum side plate 41 in the first direction and one end portion of the second drum side plate 42 in the first direction. The one end portion of the first drum side plate 41 in the first direction and the one end portion of the second drum side plate 42 in the first direction are connected to each other by the first connecting plate 43. Part of an outer peripheral surface of the photosensitive drum 22 is covered by the first connecting plate 43. In the present embodiment, part of the frame main body 31 and part of the frame cover 32 constitute the first connecting plate 43. Incidentally, the first connecting plate 43 may be configured of a single member.

The second connecting plate 44 is positioned at the another end portion 212 of the drum frame 21 in the first direction. The second connecting plate 44 extends in the second direction between another end portion of the first drum side plate 41 in the first direction and another end portion of the second drum side plate 42 in the first direction. The another end portion of the first drum side plate 41 in the first direction and the another end portion of the second drum side plate 42 in the first direction are connected to each other by the second connecting plate 44. The photosensitive drum 22 and transfer roller 23 are positioned between the first connecting plate 43 and second connecting plate 44.

The second connecting plate 44 includes a handle 441. That is, the drum frame 21 includes the handle 441 on an outer surface of the another end portion 212 in the first direction. The user of the image-forming apparatus grasps this handle 441 at the time of attachment and detachment of the process cartridge 100 relative to the image-forming apparatus.

The drum bottom plate 45 extends in the first direction and the second direction between the first drum side plate 41 and the second drum side plate 42 and between the first connecting plate 43 and second connecting plate 44. The first drum side plate 41 and second drum side plate 42 are connected to each other by the drum bottom plate 45. The drum bottom plate 45 has a conveyor opening 451 and a first opening 452.

The conveyor opening 451 is an opening that penetrates the drum bottom plate 45 in the third direction. The conveyor opening 451 is positioned between the transfer roller 23 and conveying roller 24 in the first direction. The drum bottom plate 45 also includes a plurality of guide ribs 453 protruding toward the inside of the conveyor opening 451. A printing sheet conveyed by the conveying roller 24 is configured to be guided to the conveyor opening 451, while being in contact with the guide ribs 453. After passing through the conveyor opening 451, the printing sheet is inserted into a position between the photosensitive drum 22 and transfer roller 23.

The first opening 452 is an opening penetrating the drum bottom plate 45 in the third direction. The first opening 452 is positioned between the conveyor opening 451 and the first drum side plate 41. The conveyor opening 451 and first opening 452 are positioned adjacent to each other in the second direction. In the state where the developing cartridge 1 is attached to the drum frame 21, an electrical contact surface 181 of an IC chip 18 (described later) mounted on the developing cartridge 1 is exposed through the first opening 452. Accordingly, the electrical contact surface 181 can make contact with an electrical terminal (not shown) of the image-forming apparatus without being interrupted by the drum bottom plate 45.

The drum bottom plate 45 also includes a notch 454 connected to the first opening 452. The notch 454 is depressed in the first direction from the first opening 452 toward the gear portion 25 (described later). In the state where the developing cartridge 1 is attached to the drum cartridge 2, a protrusion 153 of the gear cover 152 (described later) of the developing cartridge 1 is fitted in the notch 454. With this structure, the electrical contact surface 181 can be fixed in position relative to the first opening 452.

The photosensitive drum 22 is rotatable about a rotational axis (first axis) extending in the second direction. The photosensitive drum 22 is positioned at the one end portion 211 of the drum frame 21 in the first direction. The photosensitive drum 22 is disposed along the first connecting plate 43. Upon attachment of the developing cartridge 1 to the drum cartridge 2, an outer peripheral surface of a developing roller 13 (described later) and the outer peripheral surface of the photosensitive drum 22 contact each other.

The photosensitive drum 22 of the present embodiment includes a drum main body 221 and a drum shaft 222. The drum main body 221 is a cylindrical-shaped member extending in the second direction. The drum main body 221 has an outer peripheral surface covered with a photosensitive material. The drum shaft 222 is a columnar-shaped member extending in the second direction along the rotational axis of the photosensitive drum 22. The drum shaft 222 is inserted in a through-hole formed in a center of the drum main body 221. The drum main body 221 is fixed to the drum shaft 222 so as not to rotate relative to the drum shaft 222.

The drum shaft 222 has one end in the second direction fixed to a drum gear 251. The drum gear 251 belongs to the gear portion 25 (described later). The drum gear 251 is rotatable about the first axis. The drum shaft 222 and drum main body 221 are thus rotatable when driven by the gear portion 25. Incidentally, the drum shaft 222 may not penetrate the drum main body 221 in the second direction. For example, a pair of drum shafts 222 may be provided each at each end of the drum main body 221 in the second direction to extend outward therefrom in the second direction.

As a material for the drum shaft 222, an electrically conductive member, such as metal, may be employed. The drum shaft 222 is connectable to a ground terminal of the image-forming apparatus. With this configuration, the drum shaft 222 can be maintained at a reference voltage.

The transfer roller 23 is a roller rotatable about a rotational axis (transfer-roller axis) extending in the second direction. The transfer roller 23 is positioned at the one end portion 211 of the drum frame 21 in the first direction. The transfer roller 23 is disposed along the first connecting plate 43. An outer peripheral surface of the transfer roller 23 is in contact with the outer peripheral surface of the photosensitive drum 22. While a printing sheet passes between the photosensitive drum 22 and transfer roller 23, the transfer roller 23 presses the printing sheet against the outer peripheral surface of the photosensitive drum 22. Through this operation, toner adhered to the peripheral surface of the photosensitive drum 22 is transferred onto the printing sheet.

As described above, the drum cartridge 2 of the present embodiment includes the transfer roller 23. Hence, replacement of the transfer roller 23 can be accomplished along with replacement of the drum cartridge 2.

The conveying roller 24 is a roller rotatable about a rotational axis (conveying-roller axis) extending in the second direction. The conveying roller 24 is disposed along the conveyor opening 451. The photosensitive drum 22 and the conveying roller 24 are disposed to be spaced apart from each other in the first direction and to be in parallel to each other. The transfer roller 23 and the conveying roller 24 are also disposed to be spaced apart from each other in the first direction and to be in parallel to each other. The conveying roller 24 are rotatable upon contact with a printing sheet. The printing sheet is conveyed toward a position between the photosensitive drum 22 and transfer roller 23 while being in contact with the conveying roller 24 and a plurality of ribs 116 of the developing cartridge 1.

In this way, the drum cartridge 2 of the present embodiment includes the conveying roller 24. Hence, replacement of the conveying roller 24 can be realized concurrently with replacement of the drum cartridge 2.

The gear portion 25 is positioned at the first drum side plate 41. The gear portion 25 includes: a plurality of gears including the drum gear 251 described above; and a coupling 252. The plurality of gears is accommodated in a space formed between the frame main body 31 and the frame cover 32. The coupling 252 is exposed outside through the frame cover 32. In a state where the process cartridge 100 is mounted in the image-forming apparatus, a drive shaft of the image-forming apparatus is connected to the coupling 252. Rotation of the drive shaft is configured to be transmitted to the plurality of gears through the coupling 252.

Incidentally, the plurality of gears included in the gear portion 25 may be configured to transmit rotational force by meshing engagement with one another, or friction against one another.

The charging device 26 is positioned at the one end portion 211 of the drum frame 21 in the first direction. The charging device 26 is disposed along the photosensitive drum 22. The charging device 26 is configured to uniformly charge the peripheral surface of the photosensitive drum 22. In the present embodiment, a Scorotron charger is employed as the charging device 26. Employing a non-contact charger, such as a Scorotron charger, can charge the peripheral surface of the photosensitive drum 22 without any pressure thereto. Hence, the photosensitive drum 22 can be suppressed from getting distorted or damaged. Incidentally, a contact-type charger, such as a charging roller, may be employed, instead of the non-contact charger.

The drum cartridge 2 also includes a charging electrode 261. The charging electrode 261 is an electrode for supplying power to the charging device 26. The charging electrode 261 is positioned at an outer surface of the second drum side plate 42. The charging electrode 261 is electrically in contact with the charging electrode 261. The charging electrode 261 has a charging contact surface 262. Upon attachment of the process cartridge 100 to the image-forming apparatus, the charging contact surface 262 is made in contact with an electrode provided in the image-forming apparatus. Power is therefore supplied to the charging device 26 from the image-forming apparatus.

The drum cartridge 2 of the present embodiment includes the charging device 26, as described above. Hence, at the time of replacement of the drum cartridge 2, the charging device 26 can also be replaced.

The first pressing member 27 and second pressing member 28 are positioned at the another end portion 212 of the drum frame 21 in the first direction. The first pressing member 27 protrudes toward the photosensitive drum 22 in the first direction from one end of the second connecting plate 44 in the second direction. The second pressing member 28 protrudes toward the photosensitive drum 22 in the first direction from another end of the second connecting plate 44 in the second direction. The first pressing member 27 and second pressing member 28 may be integral with the second connecting plate 44, or may be separate members from the second connecting plate 44.

Upon attachment of the developing cartridge 1 to the drum frame 21, the casing 11 of the developing cartridge 1 is in contact with the first pressing member 27 and second pressing member 28. With this structure, the developing cartridge 1 is pressed toward the one end portion 211 of the drum frame 21 in the first direction, thereby pressing the developing roller 13 toward the photosensitive drum 22.

2-2. IC Chip

The drum cartridge 2 further includes an IC chip 29. The IC chip 29 is a plate-shaped storage medium (first storage medium). The IC chip 29 stores various information relating to the drum cartridge 2 (for example, information regarding service life of components such as the photosensitive drum 22 and the charging device 26).

Figure 5:
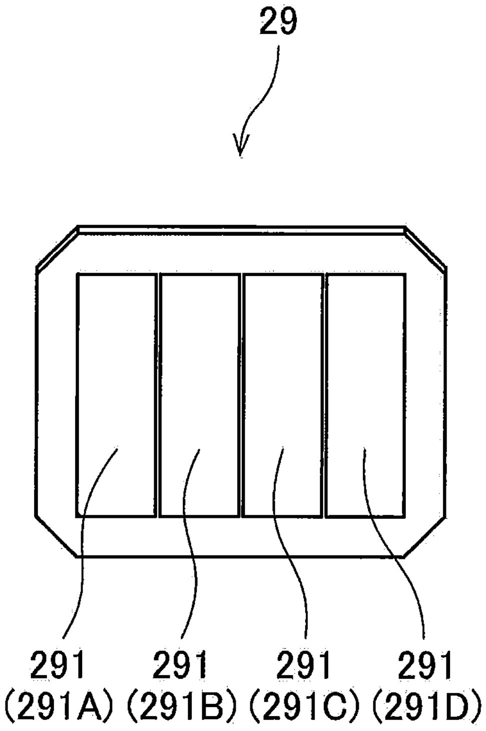
FIG. 5 is an external view of an IC chip of the drum cartridge of the process cartridge according to the embodiment.

FIG. 5 is an external view of the IC chip 29. As illustrated in FIG. 5, the IC chip 29 includes a plurality of electrical contact surfaces 291 (first electrical contact surfaces). The plurality of electrical contact surfaces 291 is arranged in line in the second direction or in the third direction. Incidentally, the IC chip 29 may have only one electrical contact surface 291. The electrical contact surfaces 291 are made of metal which is an electrical conductor. Upon attachment of the process cartridge 100 to the image-forming apparatus, the electrical contact surfaces 291 are made in contact with electrical terminals provided in the image-forming apparatus, thereby establishing electrical connection between the electrical terminals and the electrical contact surfaces 291. As a result, the image-forming apparatus can perform at least one of: reading out information from the IC chip 29; and writing information into the IC chip 29.

In the state where the developing cartridge 1 is attached to the drum frame 21, the IC chip 29 is positioned at an exposed outer surface of the drum frame 21. Specifically, the IC chip 29 is fixed to the exposed outer surface of the drum frame 21. This structure enables the electrical contact surfaces 291 of the IC chip 29 to contact the electrical terminals of the image-forming apparatus even in the state where the developing cartridge 1 is attached to the drum frame 21. Incidentally, the IC chip 29 may be fixed to the drum frame 21 by bonding or screwing, for example.

More specifically, the electrical contact surfaces 291 are configured of: an SIO (data) terminal 291A, a GND (ground) terminal 291B, an SCK (serial clock) terminal 291C, and a PWR (power) terminal 291D. The electrical contact surfaces 291 are arranged in line, in the second direction or in third direction, sequentially in an order of: the SIO terminal 291A, the GND terminal 291B, the SCK terminal 291C, and the PWR terminal 291D.

Incidentally, the order of arrangement among the SIO terminal 291A, GND terminal 291B, SCK terminal 291C and PWR terminal 291D may not be limited to that of the embodiment described above.

For example, the electrical contact surfaces 291 may be arranged, in the second direction or in third direction, in an order of: the SIO terminal 291A, GND terminal 291B, PWR terminal 291D, and SCK terminal 291C.

Alternatively, for example, the electrical contact surfaces 291 may be arranged, in the second direction or in third direction, in an order of: the SIO terminal 291A, SCK terminal 291C, GND terminal 291B and PWR terminal 291D.

Alternatively, for example, the electrical contact surfaces 291 may be arranged, in the second direction or in third direction, in an order of: the SIO terminal 291A, SCK terminal 291C, PWR terminal 291D, and GND terminal 291B.

Alternatively, for example, the electrical contact surfaces 291 may be arranged, in the second direction or in third direction, in an order of: the SIO terminal 291A, PWR terminal 291D, GND terminal 291B, and SCK terminal 291C.

Alternatively, for example, the electrical contact surfaces 291 may be arranged, in the second direction or in third direction, in an order of: the SIO terminal 291A, PWR terminal 291D, SCK terminal 291C, and GND terminal 291B.

Alternatively, for example, the electrical contact surfaces 291 may be arranged, in the second direction or in third direction, in an order of: the GND terminal 291B, SIO terminal 291A, SCK terminal 291C and PWR terminal 291D.

Alternatively, for example, the electrical contact surfaces 291 may be arranged, in the second direction or in third direction, in an order of: the GND terminal 291B, SIO terminal 291A, PWR terminal 291D, and SCK terminal 291C.

Alternatively, for example, the electrical contact surfaces 291 may be arranged, in the second direction or in third direction, in an order of: the GND terminal 291B, SCK terminal 291C, SIO terminal 291A, and PWR terminal 291D.

Alternatively, for example, the electrical contact surfaces 291 may be arranged, in the second direction or in third direction, in an order of: the GND terminal 291B, SCK terminal 291C, PWR terminal 291D, and SIO terminal 291A.

Alternatively, for example, the electrical contact surfaces 291 may be arranged, in the second direction or in third direction, in an order of: the GND terminal 291B, PWR terminal 291D. SIO terminal 291A, and SCK terminal 291C.

Alternatively, for example, the electrical contact surfaces 291 may be arranged, in the second direction or in third direction, in an order of: the GND terminal 291B, PWR terminal 291D, SCK terminal 291C, and SIO terminal 291A.

Alternatively, for example, the electrical contact surfaces 291 may be arranged, in the second direction or in third direction, in an order of: the SCK terminal 291C, SIO terminal 291A, GND terminal 291B, and PWR terminal 291D.

Alternatively, for example, the electrical contact surfaces 291 may be arranged, in the second direction or in third direction, in an order of: the SCK terminal 291C, SIO terminal 291A, PWR terminal 291D, and GND terminal 291B.

Alternatively, for example, the electrical contact surfaces 291 may be arranged, in the second direction or in third direction, in an order of: the SCK terminal 291C, GND terminal 291B, SIO terminal 291A, and PWR terminal 291D.

Alternatively, for example, the electrical contact surfaces 291 may be arranged, in the second direction or in third direction, in an order of: the SCK terminal 291C, GND terminal 291B, PWR terminal 291D, and SIO terminal 291A.

Alternatively, for example, the electrical contact surfaces 291 may be arranged, in the second direction or in third direction, in an order of: the SCK terminal 291C, PWR terminal 291D, SIO terminal 291A, and GND terminal 291B.

Alternatively, for example, the electrical contact surfaces 291 may be arranged, in the second direction or in third direction, in an order of: the SCK terminal 291C, PWR terminal 291D, GND terminal 291B, and SIO terminal 291A.

Alternatively, for example, the electrical contact surfaces 291 may be arranged, in the second direction or in third direction, in an order of: the PWR terminal 291D, SIO terminal 291A, GND terminal 291B, and SCK terminal 291C.

Alternatively, for example, the electrical contact surfaces 291 may be arranged, in the second direction or in third direction, in an order of: the PWR terminal 291D, SIO terminal 291A, SCK terminal 291C, and GND terminal 291B.

Alternatively, for example, the electrical contact surfaces 291 may be arranged, in the second direction or in third direction, in an order of: the PWR terminal 291D, GND terminal 291B, SIO terminal 291A, and SCK terminal 291C.

Alternatively, for example, the electrical contact surfaces 291 may be arranged, in the second direction or in third direction, in an order of: the PWR terminal 291D, GND terminal 291B, SCK terminal 291C, and SIO terminal 291A.

Alternatively, for example, the electrical contact surfaces 291 may be arranged, in the second direction or in third direction, in an order of: the PWR terminal 291D, SCK terminal 291C, SIO terminal 291A, and GND terminal 291B.

Still alternatively, for example, the electrical contact surfaces 291 may be arranged, in the second direction or in third direction, in an order of: the PWR terminal 291D, SCK terminal 291C, GND terminal 291B, and SIO terminal 291A.

Hereinafter, locations at which the IC chip 29 is possibly disposed on the outer surface of the drum frame 21 will be described.

(a) Possible Locations on the Drum Bottom Plate

Figure 6:
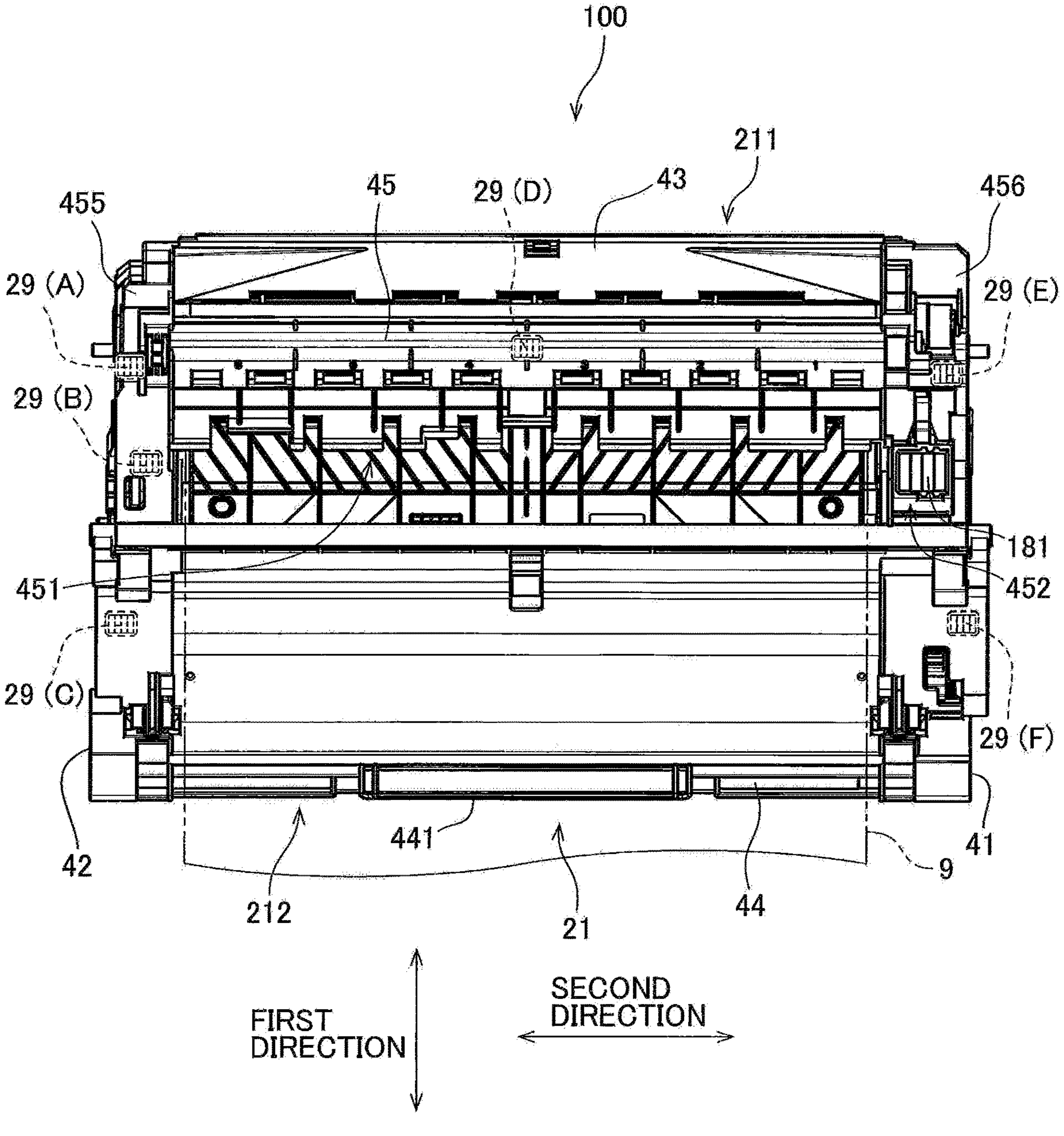
FIG. 6 is a plan view of the drum cartridge according to the embodiment as viewed from a side of a drum bottom wall.

FIG. 6 is a plan view of the process cartridge 100 when viewed from the side of the drum bottom plate 45. In FIG. 6, locations 29(A)-29(F) are indicated by broken lines as possible positions for arranging the IC chip 29. Further, in FIG. 6, two-dot chain lines indicate a conveying path 9 along which printing sheets are to be conveyed.

The IC chip 29 is possibly disposed at the locations 29(A)-29(F) on the outer surface of the drum bottom plate 45. With such arrangements, the electrical contact surface 181 (described later) of the IC chip 18 of the developing cartridge 1 faces in the same direction as the electrical contact surfaces 291 of the IC chip 29 of the drum cartridge 2 faces. Accordingly, both the electrical contact surface 181 and electrical contact surfaces 291 can be moved in the same direction, in the same posture, at the time of insertion of the process cartridge 100 into the image-forming apparatus. Such arrangements thus facilitate establishing compatibility between reliably contact of the electrical contact surface 181 with the electrical terminal of the image-forming apparatus and reliably contact of the electrical contact surfaces 291 with other electrical terminals of the image-forming apparatus.

Further, a direction of force which the electrical contact surface 181 receives from the corresponding electrical terminal of the image-forming apparatus can be coincident with a direction of force which the electrical contact surfaces 291 receive from the corresponding electrical terminals of the image-forming apparatus. Hence, positioning of the process cartridge 100 relative to the image-forming apparatus can be easily realized.

In case of the locations 29(A)-29(C), 29(E) and 29(F), the electrical contact surfaces 291 are positioned outward relative to the conveyor opening 451 with respect to the second direction. Specifically, in case of the locations 29(A)-29(C), with respect to the second direction, the electrical contact surfaces 291 are positioned between the conveyor opening 451 and another end in the second direction of the drum frame 21. In case of the locations 29(E) and 29(F), with respect to the second direction, the electrical contact surfaces 291 are positioned between the conveyor opening 451 and one end in the second direction of the drum frame 21. That is, on the outer surface of the drum bottom plate 45, the electrical contact surfaces 291 are positioned to be offset from the conveying path 9 for the printing sheet. This arrangement can prevent printing sheets from making contact with the electrical contact surfaces 291 while the printing sheets are being conveyed.

In particular, in case of the location 29(B), the electrical contact surfaces 291 are positioned opposite the first opening 452 with respect to the conveyor opening 451. That is, in the state where the developing cartridge 1 (described later) is attached to the drum frame 21, at least part of the electrical contact surfaces 291 is positioned opposite the electrical contact surface 181 exposed through the first opening 452 with respect to the conveyor opening 451. This structure enables the electrical contact surfaces (291 and 181) to contact the corresponding electrical terminals of the image-forming apparatus on both sides of the conveyor opening 451 in the second direction. The electrical contact surface 181 and electrical contact surfaces 291 are therefore suppressed from getting inclined relative to the image-forming apparatus.

In case of the location 29(D), the electrical contact surfaces 291 is positioned between the conveyor opening 451 and the one end portion 211 of the drum frame 21 in the first direction. In this case as well, the electrical contact surfaces 291 can be positioned to be offset from the conveying path 9. Accordingly, the conveyed printing sheets can be prevented from getting in contact with the electrical contact surfaces 291. Further, the user holds the handle 441 provided at the another end portion 212 in the first direction of the drum frame 21. Arranging the electrical contact surfaces 291 on the location 29(D) can thus restrain the user from contacting with the electrical contact surfaces 291.

In case of the location 29(D), at least part of the electrical contact surfaces 291 may be positioned opposite the photosensitive drum 22 with respect to the transfer roller 23. Alternatively, in case of the location 29(D), the electrical contact surfaces 291 and photosensitive drum 22 may overlap with each other with respect to the third direction. Further, in case of the location 29(D), it is preferable that the electrical contact surfaces 291 be positioned at a center of the drum bottom plate 45 with respect to the second direction. Specifically, at least one of the electrical contact surfaces 291 of the IC chip 29 be preferably positioned to overlap, with respect to the first direction, with a center in the second direction of the conveyor opening 451. Incidentally, the electrical contact surfaces 291 may be positioned to be offset from the center of the conveyor opening 451 in the second direction.

The drum bottom plate 45 has a first end portion 455 and a second end portion 456. The first end portion 455 is positioned at the one end of the drum frame 21 in the second direction. The second end portion 456 is positioned at the another end of the drum frame 21 in the second direction. That is, the first end portion 455 is positioned closer to the drum gear 251 than the second end portion 456 is to the drum gear 251. The first end portion 455 and second end portion 456 are spaced apart from each other in the second direction. The electrical contact surfaces 291 may be positioned on an outer surface of the first end portion 455, such as at the locations 29(A), 29(B) and 29(C). Alternatively, the electrical contact surfaces 291 may be positioned on an outer surface of the second end portion 456, such as at the locations 29(E) and 29(F). In case of the locations 29(E) and 29(F), vibrations originating from the drum gear 251 can be suppressed from being transmitted to the electrical contact surfaces 291.

(b) Possible Locations on a Side Opposite the Drum Bottom Plate

Figure 7:
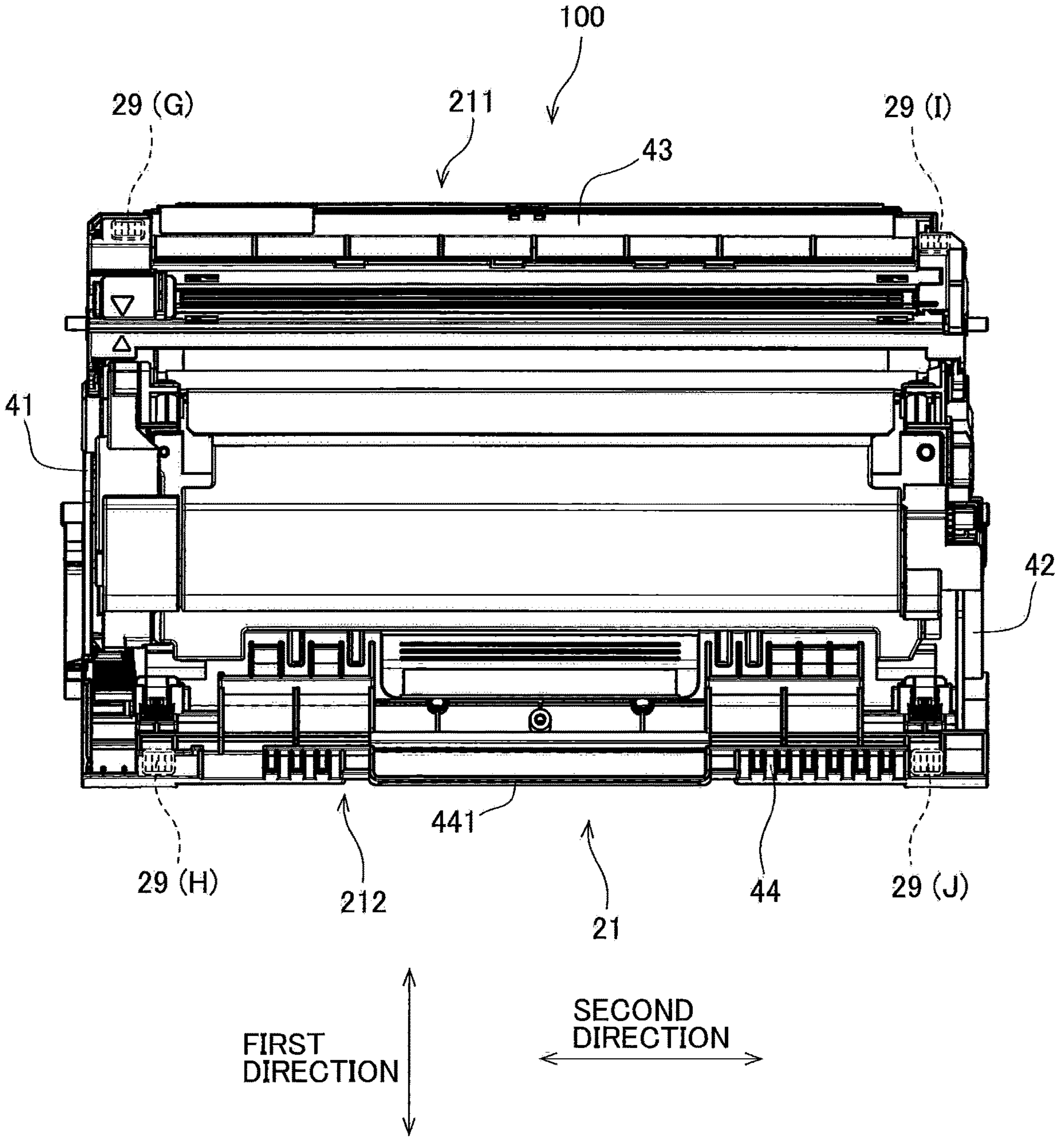
FIG. 7 is a plan view of the drum cartridge according to the embodiment as viewed from a side opposite the side of the drum bottom wall.

FIG. 7 is a plan view of the process cartridge 100 when viewed from a side opposite the drum bottom plate 45. In FIG. 7, locations 29(G)-29(J) are indicated by broken lines as possible positions for arranging the IC chip 29.

The electrical contact surfaces 291 may be positioned on an end face of the first drum side plate 41, the second drum side plate 42, the first connecting plate 43, or the second connecting plate 44, the end face opposite the drum bottom plate 45 with respect to the third direction.

Like the locations 29(G) and 29(I), the electrical contact surfaces 291 may be positioned on an outer surface of the one end portion 211 in the first direction of the drum frame 21. Since the user holds the handle 441 provided at the another end portion 212 of the drum frame 21, arranging the electrical contact surfaces 291 on the outer surface of the one end portion 211 of the drum frame 21 can reduce a likelihood that the user touches the electrical contact surfaces 291.

Alternatively, the electrical contact surfaces 291 may be positioned on an outer surface of the another end portion 212 in the first direction of the drum frame 21, just like the locations 29(H) and 29(J). This structure can restrict contact of the electrical contact surfaces 291 with part of the image-forming apparatus during attachment of the process cartridge 100 to the image-forming apparatus.

(c) Possible Locations on the First Connecting Plate

Figure 8:
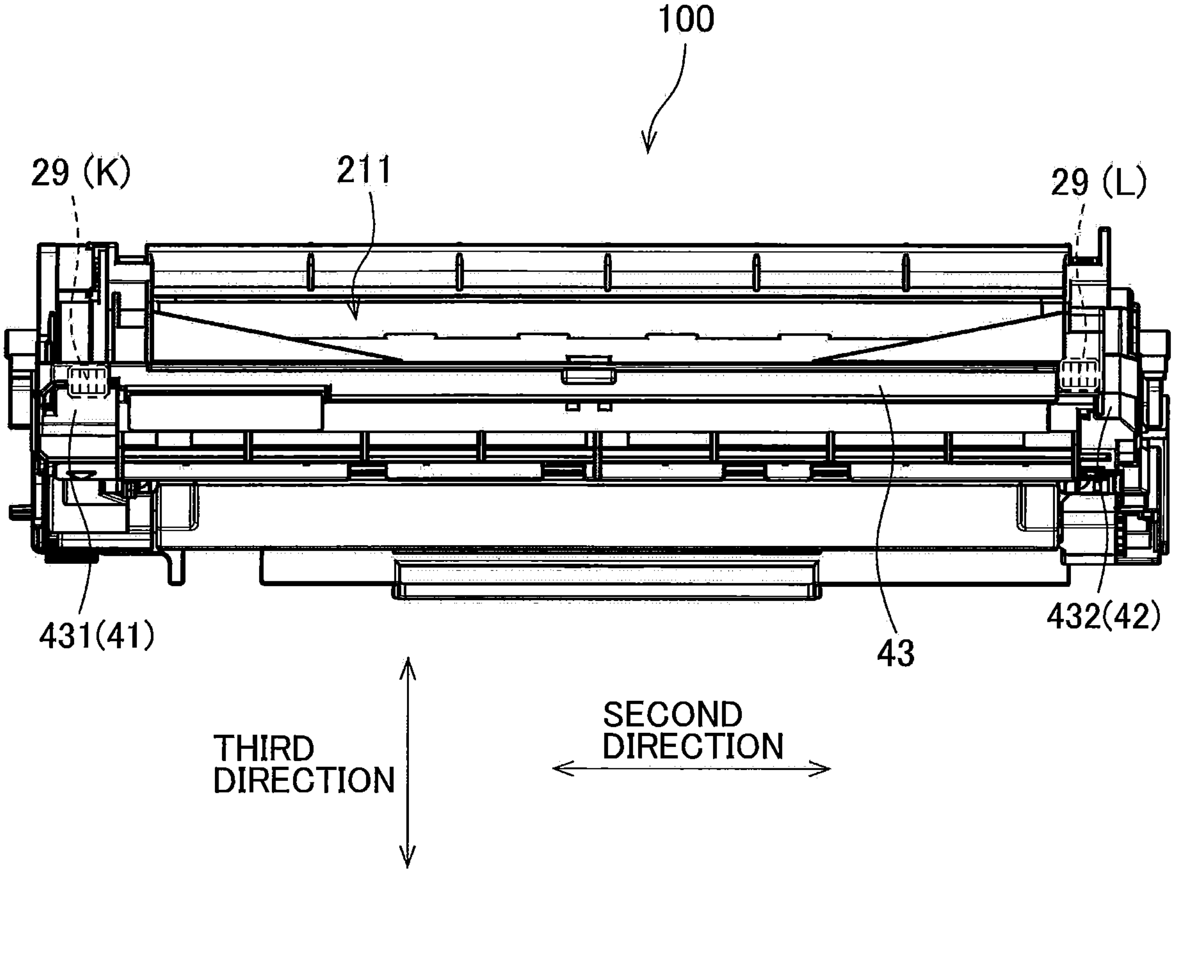
FIG. 8 is a plan view of the process cartridge according to the embodiment as viewed from a side of a first connecting plate (one side in a first direction)

FIG. 8 is a plan view of the process cartridge 100 when viewed from a side of the first connecting plate 43 (one side in the first direction). In FIG. 8, locations 29(K) and 29(L) are indicated by broken lines as possible positions for arranging the IC chip 29.

The electrical contact surfaces 291 may be disposed on an outer surface of the first connecting plate 43, just like the locations 29(K) and 29(L). That is, the electrical contact surfaces 291 may be positioned on the outer surface of the one end portion 211 in the first direction of the drum frame 21. Since the user holds the handle 441 provided at the another end portion 212 of the drum frame 21, arranging the electrical contact surfaces 291 on the outer surface of the one end portion 211 of the drum frame 21 can reduce a likelihood that the user touches the electrical contact surfaces 291.

In case of the locations 29(K) and 29(L), the electrical contact surfaces 291 and the handle 441 to be held by the user are positioned at opposite ends of the drum cartridge 2 with respect to the first direction. Further, a distance in the first direction between the first connecting plate 43 and photosensitive drum 22 is shorter than a distance in the first direction between the first connecting plate 43 and the handle 441. Arranging the electrical contact surfaces 291 away from the handle 441 in this way can help restricting the user from touching the electrical contact surfaces 291.

The first connecting plate 43 has a first end portion 431 and a second end portion 432. The first end portion 431 is positioned at the one end of the drum frame 21 in the second direction. The second end portion 432 is positioned at the another end of the drum frame 21 in the second direction. That is, the first end portion 431 is positioned closer to the drum gear 251 than the second end portion 432 is to the drum gear 251. Part of an outer surface of the drum gear 251 is covered with the first end portion 431. The first end portion 431 and second end portion 432 are spaced apart from each other in the second direction. The electrical contact surfaces 291 may be positioned on an outer surface of the first end portion 431, like the location 29(K). Alternatively, the electrical contact surfaces 291 may be positioned at an outer surface of the second end portion 432, like the location 29(L). In case of the location 29(L), vibrations originating from the drum gear 251 is less likely to be transmitted to the electrical contact surfaces 291.

(d) Possible Locations on the Second Connecting Plate

Figure 9:
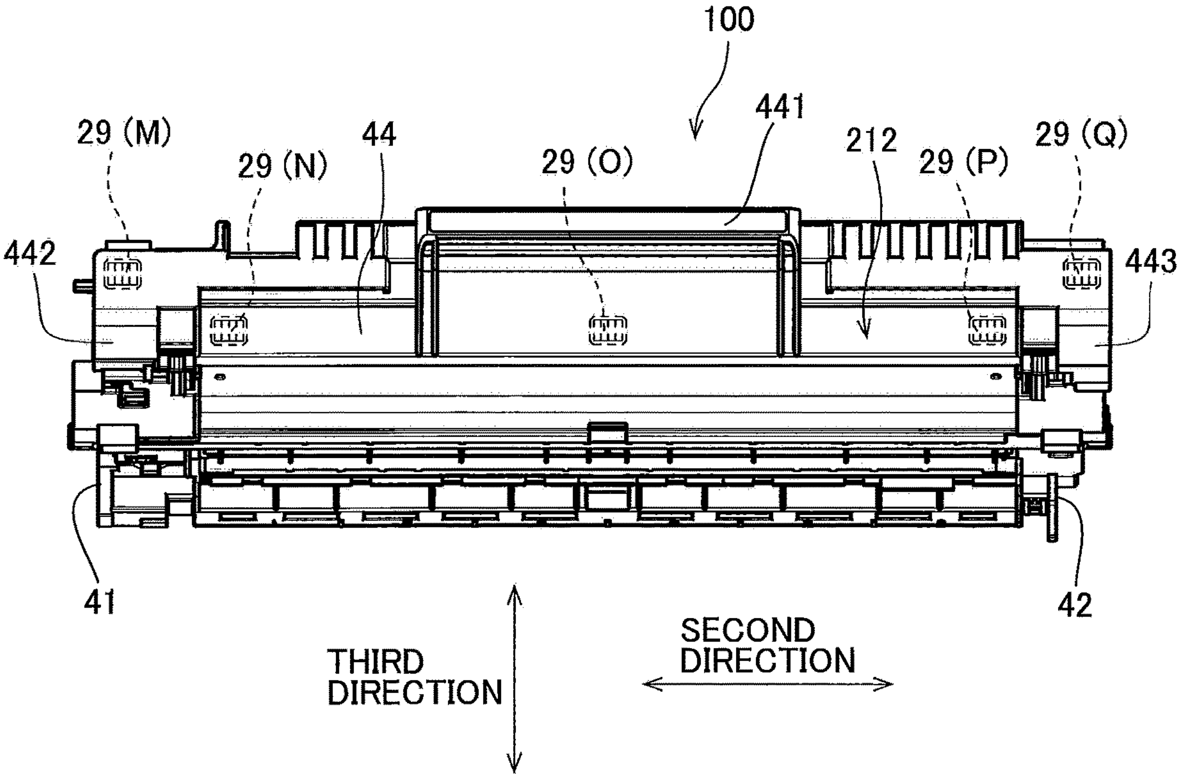
FIG. 9 is a plan view of the process cartridge according to the embodiment as viewed from a side of a second connecting plate (another side in the first direction)

FIG. 9 is a plan view of the process cartridge 100 when viewed from a side of the second connecting plate 44 (another side in the first direction). In FIG. 9, locations 29(M)-29(Q) are indicated by broken lines as possible positions for arranging the IC chip 29.

The electrical contact surfaces 291 may be disposed on an outer surface of the second connecting plate 44, just as the locations 29(M)-29(Q). That is, the electrical contact surfaces 291 may be positioned on the outer surface of the another end portion 212 in the first direction of the drum frame 21. This structure can restrict contact of the electrical contact surfaces 291 against part of the image-forming apparatus during attachment of the process cartridge 100 to the image-forming apparatus.

In particular, in case of the locations 29(M), 29(N), 29(P) and 29(Q), the electrical contact surfaces 291 are positioned to be spaced apart from the handle 441 in the second direction. That is, the electrical contact surfaces 291 are arranged at different positions from the handle 441 with respect to the second direction. This arrangement can therefore suppress the user from touching the electrical contact surfaces 291.

The second connecting plate 44 has a first end portion 442 and a second end portion 443. The first end portion 442 is positioned at the one end of the drum frame 21 in the second direction. The second end portion 443 is positioned at the another end pf the drum frame 21 in the second direction. In other words, the first end portion 442 is positioned closer to the drum gear 251 than the second end portion 443 is to the drum gear 251. The first end portion 442 and the second end portion 443 are spaced apart from each other in the second direction. The electrical contact surfaces 291 may be positioned at an outer surface of the first end portion 442, just like the location 29(M). Alternatively, the electrical contact surfaces 291 may be positioned an outer surface of the second end portion 443, like the location 29(Q). In case of the location 29(Q), vibrations originating from the drum gear 251 is less likely to be transmitted to the electrical contact surfaces 291.

(e) Possible Locations on the First Drum Side Plate

Figure 10:
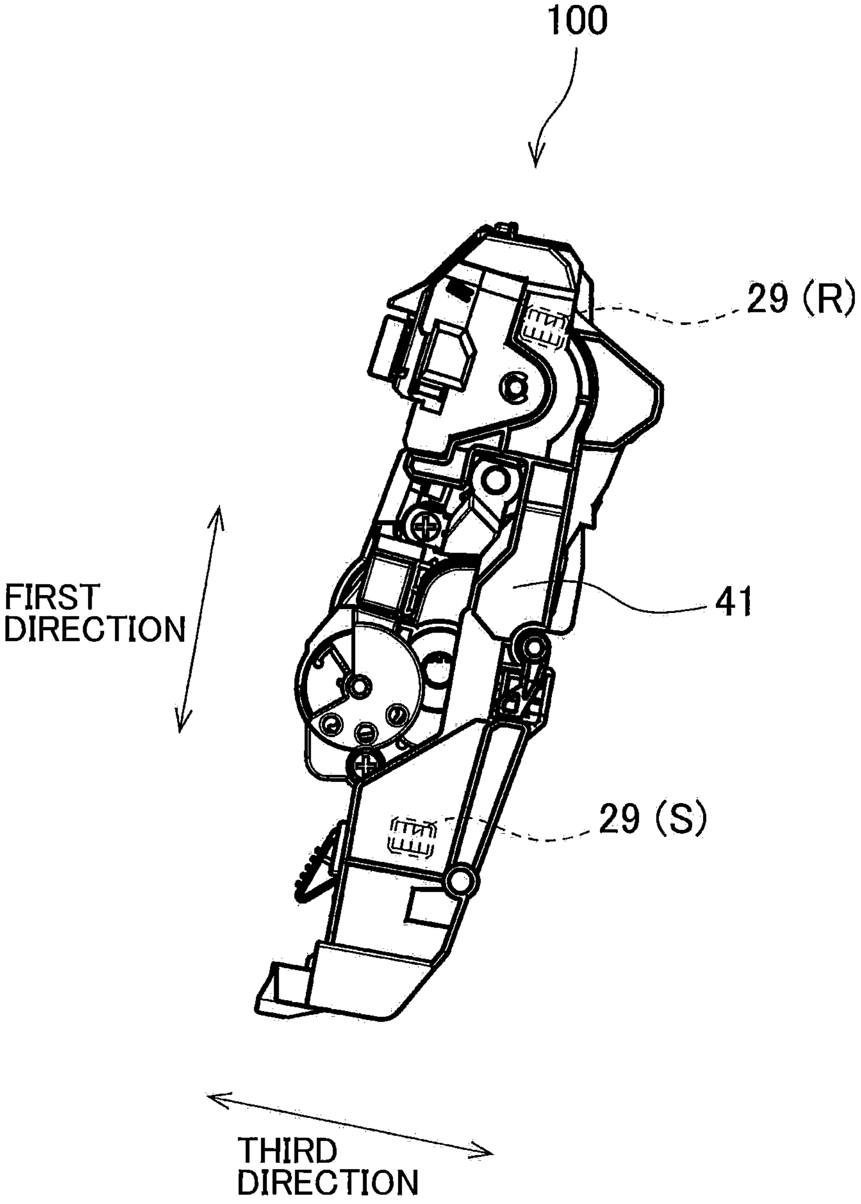
FIG. 10 is a plan view of the process cartridge according to the embodiment as viewed from a side of a first drum side plate (one side in a second direction)

FIG. 10 is a plan view of the process cartridge 100 when viewed from a side of the first drum side plate 41 (one side in the second direction). In FIG. 10, locations 29(R) and 29(S) are indicated by broken lines as possible positions for arranging the IC chip 29.

The electrical contact surfaces 291 may be positioned on an outer surface of the first drum side plate 41, like the locations 29(R) and 29(S). With such arrangements, the electrical contact surfaces 291 and the charging contact surface 262 are positioned opposite each other with respect to the second direction. Hence, the electrical contact surfaces 291 are pressed toward the corresponding electrical terminals of the image-forming apparatus by force applied to the charging contact surface 262 as a result of contact thereof with the corresponding electrical terminal upon attachment of the process cartridge 100 to the image-forming apparatus. This structure allows the electrical contact surfaces 291 to stably contact the corresponding electrical terminals of the image-forming apparatus.

(f) Possible Locations on the Second Drum Side Plate

Figure 11:
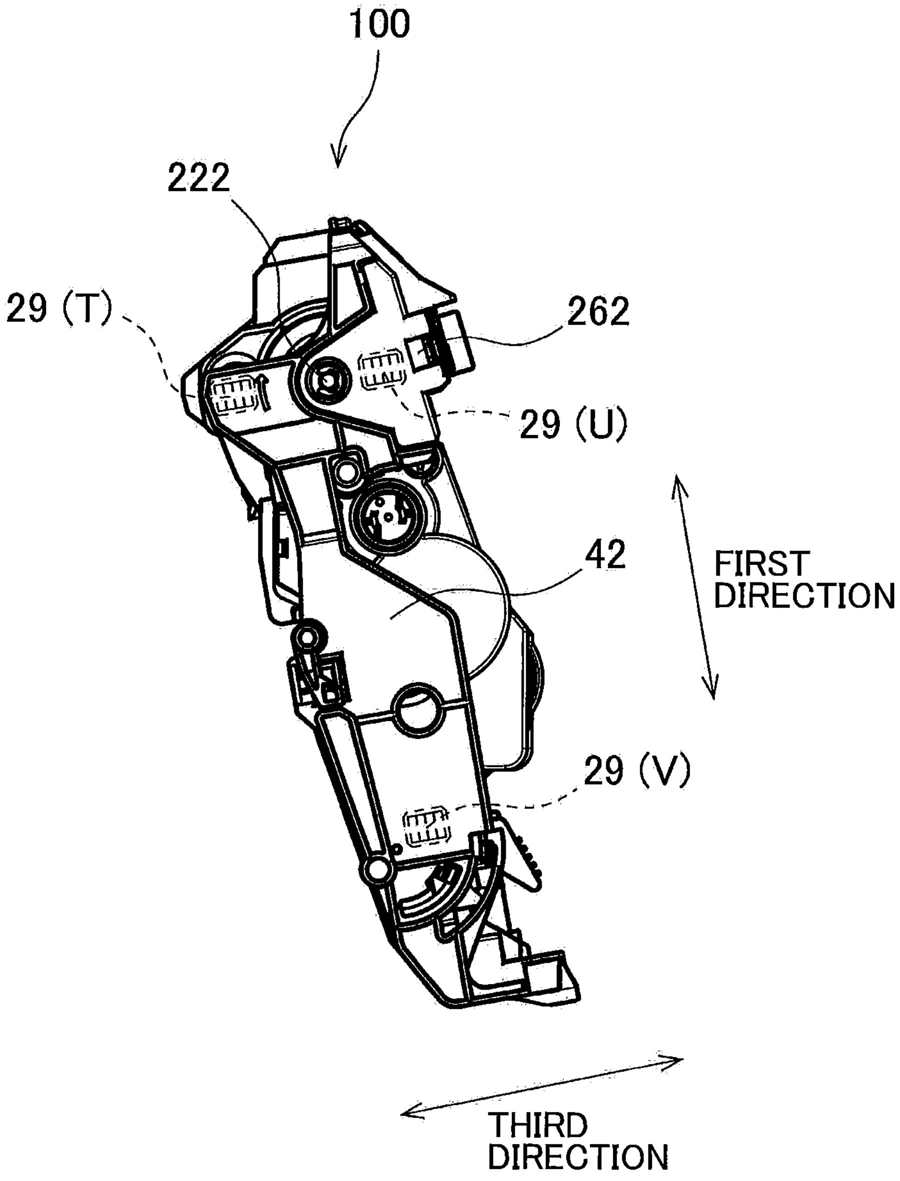
FIG. 11 is a plan view of the process cartridge according to the embodiment as viewed from a side of a second drum side plate (another side in the second direction)

FIG. 11 is a plan view of the process cartridge 100 when viewed from a side of the second drum side plate 42 (another side in the second direction). In FIG. 11, locations 29(T)-29(V) are indicated by broken lines as possible positions for arranging the IC chip 29.

The electrical contact surfaces 291 may be positioned on an outer surface of the second drum side plate 42, like the locations 29(T)-29(V). With such arrangements, the electrical contact surfaces 291 and the charging contact surface 262 are positioned at the same side as each other with respect to the second direction. The electrical contact surfaces 291 and charging contact surface 262 can be moved in the same direction, in the same posture, during insertion of the process cartridge 100 into the image-forming apparatus. This structure can easily achieve a balance between reliably contact of the electrical contact surfaces 291 with the electrical terminals of the image-forming apparatus and reliably contact of the charging contact surface 262 with the corresponding electrical terminal of the image-forming apparatus.

Further, a direction of force which the electrical contact surfaces 291 receives from the electrical terminals of the image-forming apparatus can be coincident with a direction of force that the charging contact surface 262 receives from the corresponding electrical terminal of the image-forming apparatus. Accordingly, positioning of the process cartridge 100 relative to the image-forming apparatus can be easily obtained.

Further, in case of the location 29(U), at least part of the electrical contact surfaces 291 is positioned between the charging contact surface 262 and the drum shaft 222. In case of the location 29(T), at least part of the electrical contact surfaces 291 is positioned opposite the charging contact surface 262 with respect to the drum shaft 222.

3. DEVELOPING CARTRIDGE

Figure 12:
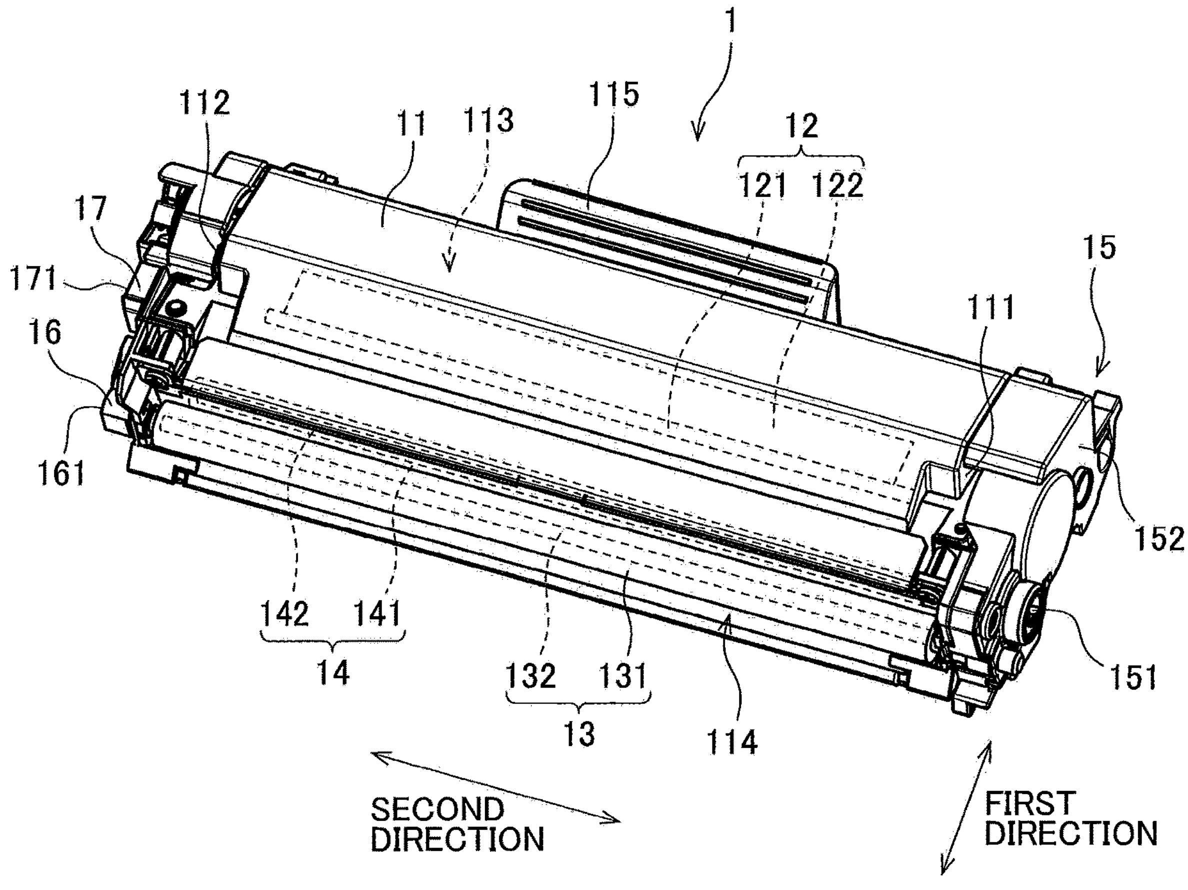
FIG. 12 is a perspective view of a developing cartridge of the process cartridge according to the embodiment according to the embodiment.
Figure 13:
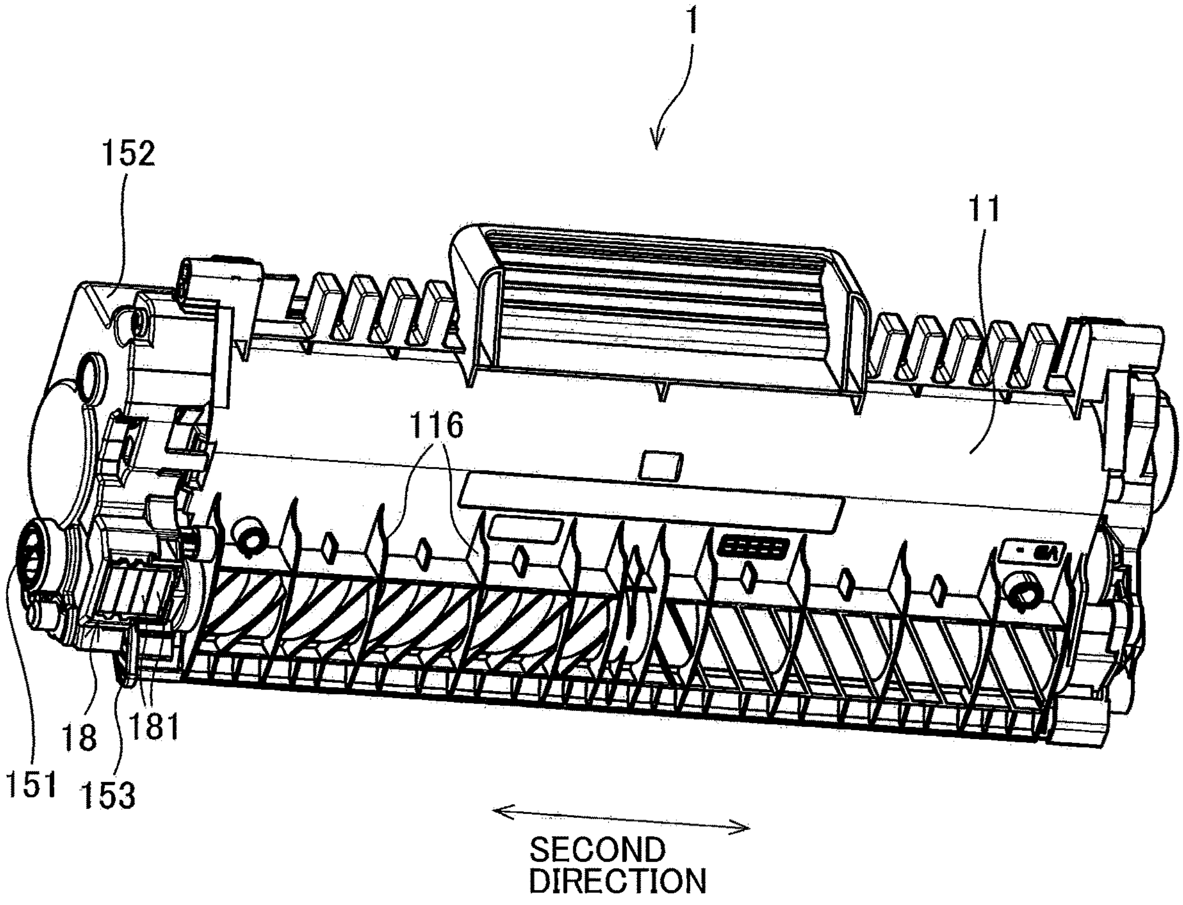
FIG. 13 is another perspective view of the developing cartridge of the process cartridge according to the embodiment.

FIGS. 12 and 13 are perspective views of the developing cartridge 1. Hereinafter, the developing cartridge 1 in its attached state to the drum cartridge 2 will be described using the above-described first direction, second direction and third direction. The developing cartridge 1 is configured to supply toner, a developing agent, to the photosensitive drum 22 of the drum cartridge 2. As illustrated in FIGS. 12 and 13, the developing cartridge 1 of the present embodiment includes the casing 11, an agitator 12, the developing roller 13, a supply roller 14, a gear portion 15, a developing electrode 16, a supply electrode 17, and the IC chip 18.

The casing 11 is a casing for accommodating toner therein. The casing 11 includes the first developing side plate 111 and the second developing side plate 112. The first developing side plate 111 is positioned at one end of the casing 11 in the second direction. The second developing side plate 112 is positioned at another end of the casing 11 in the second direction. The first developing side plate 111 and second developing side plate 112 are spaced apart from each other in the second direction. The gear portion 15 is positioned at an outer surface of the first developing side plate 111. The developing electrode 16 and supply electrode 17 are positioned at an outer surface of the second developing side plate 112. An accommodation chamber 113 is provided inside the casing 11. Toner is accommodated within the accommodation chamber 113. The casing 11 also has an open section 114. The open section 114 is positioned at one end portion of the casing 11 in the first direction. The accommodation chamber 113 is in communication with the outside through the open section 114.

The casing 11 further includes a handle 115. Of one end portion and another end portion of the casing 11 in the first direction, the handle 115 is positioned at the another end portion of the casing 11, the another end portion being farther away from the developing roller 13 than the one end portion is from the developing roller 13. The user of the image-forming apparatus holds the handle 115 when attaching and detaching the developing cartridge 1 relative to the drum cartridge 2. Further, the casing 11 includes the plurality of ribs 116. Of outer surfaces of both end portions of the casing 11 in the third direction, the plurality of ribs 116 is positioned on the outer surface that is farther away from the developing roller 13 than the other outer surface is from the developing roller 13. The plurality of ribs 116 is arranged in line in the second direction at intervals. Each rib 116 protrudes outward in the third direction from the outer surface of the casing 11.

The agitator 12 includes an agitator shaft 121 and an agitating blade 122. The agitator shaft 121 is rotatable about a rotational axis extending in the second direction. The agitating blade 122 extends radially outward from the agitator shaft 121. At least part of the agitator shaft 121 and the agitating blade 122 are positioned within the accommodation chamber 113. An agitator gear, which is included in the gear portion 15, is fixed to one end of the agitator shaft 121 in the second direction. The agitator shaft 121 and agitating blade 122 are thus rotatable by driving force from the gear portion 15. In accordance with rotation of the agitating blade 122, the toner within the accommodation chamber 113 is agitated.

The developing roller 13 is a roller rotatable about a rotational axis (second axis) extending in the second direction. The developing roller 13 is positioned at the open section 114 of the casing 11. That is, the developing roller 13 is positioned at the one end portion of the casing 11 in the first direction. Upon attachment of the developing cartridge 1 to the drum cartridge 2, an outer peripheral surface of the developing roller 13 is in contact with the outer peripheral surface of the photosensitive drum 22.

The developing roller 13 includes a developing-roller body 131 and the developing-roller shaft 132. The developing-roller body 131 is a cylindrical-shaped member extending in the second direction. As a material for the developing-roller body 131, rubber having elasticity may be used, for example. The developing-roller shaft 132 is a columnar-shaped member penetrating the developing-roller body 131 in the second direction. As a material for the developing-roller shaft 132, metal or an electrically conductive resin is available, for example. The developing-roller body 131 is fixed to the developing-roller shaft 132 so as not to rotate relative to the developing-roller shaft 132.

A developing-roller gear, which is included in the gear portion 15, is fixed to the one end of the developing-roller shaft 132 in the second direction. With this structure, the developing-roller shaft 132 and developing-roller body 131 are rotatable by driving force from the gear portion 15. Incidentally, the developing-roller shaft 132 may not penetrate the developing-roller body 131 in the second direction. For example, a pair of developing-roller shafts 132 may be provided each at each end in the second direction of the developing-roller body 131 to extend outward therefrom in the second direction.

The supply roller 14 is positioned between the developing roller 13 and the accommodation chamber 113. The supply roller 14 is a roller rotatable about a rotational axis (supply roller axis) extending in the second direction. The supply roller 14 includes a supply-roller body 141 and a supply-roller shaft 142. The supply-roller body 141 is a cylindrical-shaped member extending in the second direction. The supply-roller body 141 has an outer peripheral surface in contact with the outer peripheral surface of the developing-roller body 131. As a material for the supply-roller body 141, a rubber with elasticity may be used, for example. The supply-roller shaft 142 is a columnar-shaped member penetrating the supply-roller body 141 in the second direction. As a material for the supply-roller shaft 142, metal or an electrically conductive resin may be used, for example. The supply-roller body 141 is fixed to the supply-roller shaft 142 so as not to rotate relative to the supply-roller shaft 142.

A supply-roller gear, which is included in the gear portion 15, is fixed to one end of the supply-roller shaft 142 in the second direction. With this structure, the supply-roller shaft 142 and supply-roller body 141 are rotatable by driving force of the gear portion 15. Incidentally, the supply-roller shaft 142 may not penetrate the supply-roller body 141 in the second direction. For example, a pair of supply-roller shafts 142 may be provided each at each end in the second direction of the supply-roller body 141 to extend outward therefrom in the second direction.

When the gear portion 15 is driven, toner is supplied to the outer peripheral surface of the developing roller 13 from the accommodation chamber 113 through the supply roller 14. At this time, the toner is tribo-charged between the supply roller 14 and the developing roller 13. On the other hand, a bias voltage is applied to the developing-roller shaft 132 of the developing roller 13. Accordingly, the toner is attracted to the outer peripheral surface of the developing-roller body 131 by static electricity between the developing-roller shaft 132 and the toner.

The developing cartridge 1 further includes a layer-thickness regulating blade not illustrated in the drawings. The layer-thickness regulating blade is configured to regulate the toner supplied over the outer peripheral surface of the developing-roller body 131 into a uniform thickness. Thereafter, the toner on the outer peripheral surface of the developing-roller body 131 is supplied to the photosensitive drum 22. At this time, the toner is moved from the developing-roller body 131 to the photosensitive drum 22 according to electrostatic latent images formed on the outer peripheral surface of the photosensitive drum 22. The electrostatic latent images are thus developed into visible images on the outer peripheral surface of the photosensitive drum 22.

The gear portion 15 is positioned at the outer surface of the first developing side plate 111 of the casing 11. The gear portion 15 includes: a plurality of gears including the above-described agitator gear, developing-roller gear, and supply-roller gear; a coupling 151; and the gear cover 152. The gear cover 152 is fixed to the first developing side plate 111 of the casing 11, for example, by screwing. At least part of the plurality of gears are positioned between the first developing side plate 111 and the gear cover 152. The coupling 151 is exposed through the gear cover 152. Upon attachment of the process cartridge 100 to the image-forming apparatus, a drive shaft of the image-forming apparatus is connected to the coupling 151. Rotation of the drive shaft is configured to be transmitted, via the coupling 151, to the plurality of gears including the agitator gear, the developing-roller gear, and the supply-roller gear.

Incidentally, the plurality of gears included in the gear portion 15 may be configured to transmit rotational force by meshing engagement between gear teeth, or by friction between each other.

The developing electrode 16 is an electrode for supplying power to the developing roller 13. The developing electrode 16 is positioned at the outer surface of the second developing side plate 112 of the casing 11. Metal or electrically conductive resin may be employed as the developing electrode 16. The developing electrode 16 rotatably supports the another end of the developing-roller shaft 132 in the second direction, while being electrically in contact with the another end of the developing-roller shaft 132 in the second direction. The developing electrode 16 has a developing contact surface 161. Upon attachment of the process cartridge 100 to the image-forming apparatus, the developing contact surface 161 makes contact with a corresponding electrical terminal provided in the image-forming apparatus, thereby supplying power to the developing-roller shaft 132 from the image-forming apparatus.

The supply electrode 17 is an electrode for supplying power to the supply roller 14. The supply electrode 17 is positioned at the outer surface of the second developing side plate 112 of the casing 11. Metal or electrically conductive resin may be employed as the supply electrode 17. The supply electrode 17 rotatably supports another end of the supply-roller shaft 142 in the second direction, while being electrically in contact with the another end of the supply-roller shaft 142 in the second direction. The supply electrode 17 has a supply contact surface 171. Upon attachment of the process cartridge 100 to the image-forming apparatus, the supply contact surface 171 makes contact with a corresponding electrical terminal provided in the image-forming apparatus. A bias voltage is thus suppled to the supply-roller shaft 142 from the image-forming apparatus. As a result, a bias voltage is generated between the developing roller 13 and the supply roller 14.

The IC chip 18 is a plate-shaped storage medium (second storage medium). The IC chip 18 stores various information relating to the developing cartridge 1 (for example, information regarding service life of components such as the developing roller 13). As illustrated in FIG. 13, the IC chip 18 is positioned at one end portion of the casing 11 in the second direction. In the present embodiment, of outer surfaces of both end portions of the gear cover 152 in the third direction, the IC chip 18 is fixed to the outer surface that is positioned farther away from the developing roller 13 than the other outer surface is from the developing roller 13. Incidentally, of outer surfaces of both end portions of the casing 11 in the third direction, the IC chip 18 may be fixed to the outer surface that is positioned farther away from the developing roller 13 than the other outer surface is from the developing roller 13.

The IC chip 18 includes a plurality of the electrical contact surfaces 181 (second electrical contact surface). The electrical contact surfaces 181 are arranged in line with respect to the second direction. Each electrical contact surface 181 is a surface orthogonal to the third direction. Incidentally, the IC chip 18 may have one electrical contact surface 181. The electrical contact surfaces 181 are made of metal which is an electrical conductor. Upon attachment of the process cartridge 100 to the image-forming apparatus, the electrical contact surfaces 181 make contact with corresponding electrical terminals provided in the image-forming apparatus. The electrical contact surfaces 181 and the electrical terminals are thus electrically connected to each other. As a result, the image-forming apparatus can perform at least one of: reading out information from the IC chip 18; and writing information into the IC chip 18.

4. MODIFICATIONS

While the present disclosure has been described with reference to one embodiment thereof, the present disclosure should not be limited to the depicted embodiment.

For example, in the above-described embodiment, an IC chip having electrical contact surfaces is fixed to an outer surface of a drum frame. However, only electrical contact surfaces may be fixed to an outer surface of a drum frame, while a remaining portion other than the electrical contact surfaces may be disposed at a different portion of a drum cartridge.

Further, the first direction and the second direction may not be orthogonal to each other. The second direction and the third direction may not be orthogonal to each other. The first direction and the third direction may not be orthogonal to each other.

Detailed shapes of a developing cartridge and a drum cartridge may be different from those illustrated in each drawing of the present application. Further, elements appeared in the above-described embodiment and modifications may be combined with one another, appropriately, as long as no contradiction is generated.

What is claimed is:

1. A process cartridge comprising:

a drum cartridge including:

a drum frame having a first end portion and a second end portion spaced apart from the first end portion in a first direction, the drum frame having a third end portion and a fourth end portion spaced apart from the third end portion in a second direction;

a photosensitive drum rotatable about a first axis extending in the second direction, the photosensitive drum being positioned at the first end portion of the drum frame; and a first storage medium including a first electrical contact surface; and a developing cartridge detachably attachable to the drum frame, the developing cartridge including:

a developing roller rotatable about a second axis extending in the second direction; and a second storage medium including a second electrical contact surface, wherein the first electrical contact surface is positioned closer to the second end portion of the drum frame than the photosensitive drum is to the second end portion of the drum frame in the first direction, and wherein, in a state where the developing cartridge is attached to the drum cartridge, the second electrical contact surface is positioned closer to the second end portion of the drum frame than the photosensitive drum is to the second end portion of the drum frame in the first direction.

2. The process cartridge according to claim 1, wherein the first electrical contact surface is positioned closer to the third end portion of the drum frame than to the fourth end portion of the drum frame in the second direction, and wherein, in the state where the developing cartridge is attached to the drum cartridge, the second electrical contact surface is positioned closer to the third end portion of the drum frame than to the fourth end portion of the drum frame in the second direction.

3. The process cartridge according to claim 1, wherein the drum cartridge further includes a first handle positioned at the second end portion of the drum frame in the first direction.

4. The process cartridge according to claim 3, wherein the first electrical contact surface is positioned closer to the first handle than the photosensitive drum is to the first handle in the first direction, and wherein, in the state where the developing cartridge is attached to the drum cartridge, the second electrical contact surface is positioned closer to the first handle than the photosensitive drum is to the first handle in the first direction.

5. The process cartridge according to claim 3, wherein the developing cartridge further includes a casing accommodating toner therein, the casing having one end portion and another end portion spaced apart from the one end portion in the first direction, wherein the developing roller is positioned at the one end portion of the casing, and wherein the casing includes a second handle positioned at the another end portion of the casing.

6. The process cartridge according to claim 1, wherein the drum cartridge further includes a pressing member positioned at the second end portion of the drum frame in the first direction, and the pressing member presses the developing cartridge toward the first end portion of the drum frame in the first direction in the state where the developing cartridge is attached to the drum cartridge.

7. The process cartridge according to claim 6, wherein the first electrical contact surface is positioned closer to the pressing member than the photosensitive drum is to the pressing member in the first direction, and wherein, in the state where the developing cartridge is attached to the drum cartridge, the second electrical contact surface is positioned closer to the pressing member than the photosensitive drum is to the pressing member in the first direction.

8. The process cartridge according to claim 1, wherein the first electrical contact surface faces a third direction orthogonal to the first direction and the second direction.

9. The process cartridge according to claim 1, wherein, in the state where the developing cartridge is attached to the drum cartridge, the second electrical contact surface faces a third direction orthogonal to the first direction and the second direction.

10. The process cartridge according to claim 1, wherein the developing cartridge further includes a casing accommodating toner therein, wherein the casing includes a plurality of ribs protruding from an outer surface of the casing, and wherein the plurality of ribs is arranged in line in the second direction.

11. The process cartridge according to claim 10, wherein the plurality of ribs protrudes in a third direction orthogonal to the first direction and the second direction.

12. The process cartridge according to claim 1, wherein the first storage medium includes a plurality of the first electrical contact surfaces.

13. The process cartridge according to claim 12, wherein the plurality of the first electrical contact surfaces is arranged in line in the second direction.

14. The process cartridge according to claim 1, wherein the drum cartridge further includes:

a charging device configured to charge a peripheral surface of the photosensitive drum; and a charging electrode configured to supply power to the charging device, the charging electrode having a charging contact surface.

15. The process cartridge according to claim 14, wherein the charging contact surface is positioned closer to the fourth end portion of the drum frame than to the third end portion of the drum frame in the second direction.

16. The process cartridge according to claim 1, wherein the drum cartridge further includes a drum gear rotatable with the photosensitive drum, and wherein the drum gear is rotatable about the first axis.

17. The process cartridge according to claim 16, wherein the drum gear is positioned closer to the third end portion of the drum frame than to the fourth end portion of the drum frame in the second direction.

18. The process cartridge according to claim 1, wherein the drum frame further includes a notch, and wherein the developing cartridge further includes a protrusion that fits in the notch in the state where the developing cartridge is attached to the drum cartridge.

19. The process cartridge according to claim 1, wherein the developing cartridge further includes:

a supply roller rotatable about a supply-roller axis extending in the second direction; and a supply electrode configured to supply power to the supply roller, the supply electrode having a supply contact surface.

20. The process cartridge according to claim 19, wherein, in the state where the developing cartridge is attached to the drum cartridge, the supply contact surface is positioned closer to the fourth end portion of the drum frame than to the third end portion of the drum frame in the second direction.

* * * * *